United States Patent
Biswas et al.

(10) Patent No.: US 11,838,141 B2
(45) Date of Patent: Dec. 5, 2023

(54) AUGMENTATION OF CONTEXTUAL TIMELINE MARKERS ON A VIRTUAL VIDEO CONVERSATION

(71) Applicant: International Business Machines Corporation, Armonk, NY (US)

(72) Inventors: Pijush Kanti Biswas, New Delhi (IN); Abhishek Kumar Gautam, Delhi (IN); Biswajit Mohapatra, Pune (IN); Siddhartha Sood, Ghaziabad (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/452,847

(22) Filed: Oct. 29, 2021

(65) Prior Publication Data

US 2023/0134899 A1 May 4, 2023

(51) Int. Cl.
*H04L 12/18* (2006.01)
*H04N 7/15* (2006.01)

(52) U.S. Cl.
CPC ...... *H04L 12/1831* (2013.01); *H04L 12/1818* (2013.01); *H04N 7/155* (2013.01); *H04N 7/157* (2013.01)

(58) Field of Classification Search
CPC . H04L 12/1831; H04L 12/1818; H04N 7/155; H04N 7/157
See application file for complete search history.

(56) References Cited

U.S. PATENT DOCUMENTS

| 8,179,417 B2 | 5/2012 | Robinson |
| 8,181,115 B2 | 5/2012 | Irving |
| 8,395,655 B2 | 3/2013 | Robinson |

(Continued)

OTHER PUBLICATIONS

Authors et al.: Disclosed Anonymously, "Method and System for Dynamic Catch-up of Events in a Collaborative Online Environment", An IP.com Prior Art Database Technical Disclosure, IP.com No. IPCOM000231032D, IP.com Electronic Publication Date: Sep. 22, 2013, 4 Pages.

(Continued)

*Primary Examiner* — William G Trost, IV
*Assistant Examiner* — Abdelbasst Talioua
(74) *Attorney, Agent, or Firm* — Stephanie L. Carusillo

(57) ABSTRACT

In an approach for augmenting contextual timeline markers on a virtual video conversation, a processor records a virtual meeting on a virtual meeting platform with one or more participants. Responsive to the virtual meeting chair ending the virtual meeting with one or more incomplete tasks, a processor creates an augmented recording of the virtual meeting, wherein the augmented recording includes a timeline composed of a plurality of timeline markers, wherein a timeline marker is associated with a conversation that occurs at a particular contextual conversation point during the virtual meeting. A processor enables one or more post-meeting collaboration enabled conversations between the virtual meeting chair and one or more nonparticipants, wherein the one or more incomplete tasks are completed. A processor requests feedback on a timeline marker response associated with the one or more incomplete tasks from a timeline marker creator. A processor applies the feedback received.

20 Claims, 7 Drawing Sheets

(56) References Cited

U.S. PATENT DOCUMENTS

| | | |
|---|---|---|
| 9,049,338 B2 | 6/2015 | Witt |
| 10,389,769 B2 | 8/2019 | Gudipaty |
| 10,511,551 B2 | 12/2019 | Han |
| 10,997,651 B2 | 5/2021 | Ye |
| 2005/0097169 A1* | 5/2005 | Mukherjee ............ H04L 65/765 709/204 |
| 2010/0306018 A1 | 12/2010 | Burtner |
| 2013/0198288 A1 | 8/2013 | Jones |
| 2014/0038725 A1* | 2/2014 | Mizrahi ................ G06Q 99/00 463/42 |
| 2014/0108085 A1* | 4/2014 | Henriksen ............ G06Q 10/109 705/7.19 |
| 2014/0161244 A1 | 6/2014 | Jones |
| 2014/0282089 A1* | 9/2014 | West .................... H04M 3/565 715/753 |
| 2014/0372908 A1* | 12/2014 | Kashi .................. H04L 65/1089 715/753 |
| 2018/0232705 A1* | 8/2018 | Baker .................. G06F 3/04817 |
| 2019/0147367 A1* | 5/2019 | Bellamy ................ G06N 5/022 706/12 |
| 2021/0092168 A1* | 3/2021 | Ranalli .................. H04M 3/567 |
| 2021/0399911 A1* | 12/2021 | Jorasch ............... H04L 12/1822 |
| 2022/0014571 A1* | 1/2022 | Polish ................. H04L 65/1093 |
| 2022/0182425 A1* | 6/2022 | Braganza .............. H04L 51/216 |
| 2022/0261760 A1* | 8/2022 | Cupala ................. G06Q 10/1095 |
| 2023/0006851 A1* | 1/2023 | Chou ....................... H04N 7/15 |

OTHER PUBLICATIONS

IBM, "Announcing closed captioning and a digital assistant for Webex", IBM CIO Blog, Nov. 20, 2020, 9 Pages.

"Patent Cooperation Treaty PCT International Search Report", Applicant's File Reference: EIE220685PCT, International Application No. PCT/CN2022/119887, International Filing Date: Sep. 20, 2022, dated Dec. 12, 2022, 9 pages.

* cited by examiner

AUGMENTATION OF CONTEXTUAL TIMELINE MARKERS ON A VIRTUAL VIDEO CONVERSATION

BACKGROUND OF THE INVENTION

The present invention relates generally to the field of data processing, and more particularly to an augmentation of contextual timeline markers on a virtual video conversation.

A virtual video conversation, also referred to as a virtual meeting, is a method of communication that allows multiple participants from anywhere in the world to meet in real time and to interact in the same space without physically being present. Through technological devices with reception and transmission of audio-video signal capabilities (i.e., laptops, tablets, webcams, etc.), participants can communicate back and forth with each other using audio, video conferencing, screen sharing, and webinars on a virtual meeting platform.

Although not as widely used in everyday communication as audio-only and text-only communications, applications of virtual video conversations include sign language transmission for people who have a hearing impairment or a speech impairment, for distance education, and for telemedicine. Virtual video conversations are also used in commercial and corporate settings as a means of connecting and communicating with remote employees and clients and as a means of facilitating meetings and conferences. While these applications of virtual video conversations have always been used as a means of communication, the COVID-19 pandemic has been a great catalyst for the increase in the use of virtual video conversations. During this time of remote work and social distancing, businesses have relied on virtual video conversations to stay connected, exchange information, and work together in order to keep operations running smoothly and consistently.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

Aspects of an embodiment of the present invention disclose a method, computer program product, and computer system for augmenting contextual timeline markers on a virtual video conversation. Responsive to a virtual meeting chair starting a virtual meeting on a virtual meeting platform with one or more participants, a processor records the virtual meeting. Responsive to the virtual meeting chair ending the virtual meeting on the virtual meeting platform with one or more incomplete tasks, a processor creates an augmented recording of the virtual meeting, wherein the augmented recording includes a timeline composed of a plurality of timeline markers, wherein a timeline marker is associated with a conversation that occurs at a particular contextual conversation point during the virtual meeting. A processor enables one or more post-meeting collaboration enabled conversations between the virtual meeting chair and one or more nonparticipants, wherein the one or more incomplete tasks are completed. A processor requests feedback on a timeline marker response associated with the one or more incomplete tasks from a timeline marker creator. A processor applies the feedback on the timeline marker response received from the timeline marker creator.

In some aspects of an embodiment of the present invention, a processor converts the augmented recording of the virtual meeting to a text format. A processor creates a title for the virtual meeting. A processor creates a caption for the virtual meeting. A processor links the title of the virtual meeting and the caption for the virtual meeting. A processor integrates a timeline into a text format of the virtual meeting.

In some aspects of an embodiment of the present invention, a processor builds a list of the one or more participants and a list of the one or more nonparticipants, wherein building the list of the one or more participants and the list of the one or more nonparticipants further comprises identifying the virtual meeting chair, identifying the one or more participants, and identifying the one or more nonparticipants.

In some aspects of an embodiment of the present invention, a processor identifies one or more conversations of the virtual meeting in which post-meeting collaboration is necessary. A processor labels the one or more conversations of the virtual meeting in which post-meeting collaboration is necessary as post-meeting collaboration enabled. A processor sets one or more post-meeting collaboration parameters, wherein the one or more post-meeting collaboration parameters include a designation of the one or more nonparticipants and a length of time post-meeting collaboration will be supported.

In some aspects of an embodiment of the present invention, a processor identifies a topic of the one or more post-meeting collaboration enabled conversations, wherein identifying the topic of each of the one or more post-meeting collaboration enabled conversations further comprises: highlighting one or more relevant topics of the one or more post-meeting collaboration enabled conversations; tagging the one or more relevant topics highlighted and the timeline markers associated with the one or more relevant topics highlighted; and ranking the one or more relevant topics highlighted and the timeline markers associated with the one or more relevant topics highlighted.

In some aspects of an embodiment of the present invention, a processor enables a nonparticipant to open the augmented recording of the virtual meeting. A processor enables the nonparticipant to resume the augmented recording of the virtual meeting. A processor captures a required input from the nonparticipant. A processor determines whether a second input is required from the nonparticipant at a second timeline marker. Responsive to determining the second input is not required from the nonparticipant at the second timeline marker, a processor determines whether the nonparticipant has a question for the virtual meeting chair. Responsive to determining the nonparticipant has the question for the virtual meeting chair, a processor enables the nonparticipant to ask the virtual meeting chair the question. A processor sends an alert notification to the virtual meeting chair regarding a new timeline marker representative of the question created. A processor enables the virtual meeting chair to join the one or more post-meeting collaboration enabled conversations with the nonparticipant. A processor determines whether the nonparticipant has a second question for the virtual meeting chair. Responsive to determining the nonparticipant does not have another question for the virtual meeting chair, a processor ends the one or more post-meeting collaboration enabled conversations.

In some aspects of an embodiment of the present invention, a processor integrates the nonparticipant into the augmented recording of the virtual meeting as a virtual participant. A processor displays an avatar of the nonparticipant in the augmented recording of the virtual meeting. A processor provides the nonparticipant with an agenda of the virtual meeting, one or more goals to accomplish during the virtual meeting, and a text format of the virtual meeting. A processor highlights one or more relevant topics of the one or more post-meeting collaboration enabled conversations and one or more timeline markers associated with the one or more relevant topics of the one or more post-meeting collaboration enabled conversations. A processor directs the nonparticipant to a first timeline marker for which an input is required from the nonparticipant and to an associated question in the text format of the virtual meeting.

In some aspects of an embodiment of the present invention, a processor converts the question to text. A processor derives a context of the question using natural language processing. A processor creates the new timeline marker representative of the question. A processor adds the new timeline marker to the timeline at the particular contextual conversation point most relevant to the context of the question.

In some aspects of an embodiment of the present invention, a processor receives the feedback on the timeline marker response from the timeline marker creator. A processor retrieves a corporate profile for each of the one or more participants. A processor prioritizes the feedback response. A processor leverages a combination of feedback methods to determine whether the timeline marker response is a positive timeline marker response or a negative timeline marker response.

In some aspects of an embodiment of the present invention, a processor processes the feedback on the timeline marker response received. A processor incorporates the positive timeline marker response into the augmented recording of the virtual meeting. A processor discards the negative timeline marker response into the augmented recording of the virtual meeting. A processor makes a recommendation to the virtual meeting chair how to improve the content of the conversation based on a clustering of one or more similar questions and answers. A processor enables the virtual meeting chair to edit the augmented recording of the virtual meeting to remove one or more parts of the augmented recording of the virtual meeting where there is the clustering of the one or more similar questions and answers. A processor removes noise from the augmented recording of the virtual meeting, wherein the noise includes one or more questions, answers, or discussions that are not relevant to the conversation.

In some aspects of an embodiment of the present invention, the timeline marker creator is the virtual meeting chair, the one or more participants, or the one or more nonparticipants.

In some aspects of an embodiment of the present invention, the feedback on the timeline marker response is provided by means of a vote, by a thumbs up or a thumbs down, or by natural language feedback on which sentiment analysis can be performed.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that a virtual video conversation (hereinafter referred to as a "virtual meeting") is a method of communication that allows multiple participants from anywhere in the world to meet in real time and to interact in the same space without physically being present. Embodiments of the present invention recognize that, during normal times and during times of remote work and social distancing, businesses with international teams of professionals working remotely in different parts of several countries have relied on virtual meetings to stay connected, exchange information, and work together to keep operations running smoothly and consistently. Embodiments of the present invention recognize that having an international team of professionals working remotely in different parts of the world adds diversity, accessibility, and opportunity to businesses. Embodiments of the present invention recognize, however, that managing an international team of professions across different time zones can be challenging and can cause the team members to feel disconnected if the situation is not managed strategically. Therefore, embodiments of the present invention recognize the need for and provide a system and method to extend a virtual meeting to a post-meeting setting, where one or more nonparticipants who were unable to join the virtual meeting can contribute ideas and opinions and can ask questions of the virtual meeting chair (i.e., an individual who hosts virtual meetings as a means of connecting and communicating with other employees and/or clients and as a means of facilitating meetings and conferences), while still maintaining the context of the conversation.

Implementation of embodiments of the present invention may take a variety of forms, and exemplary implementation details are discussed subsequently with reference to the Figures.

Figure 1:
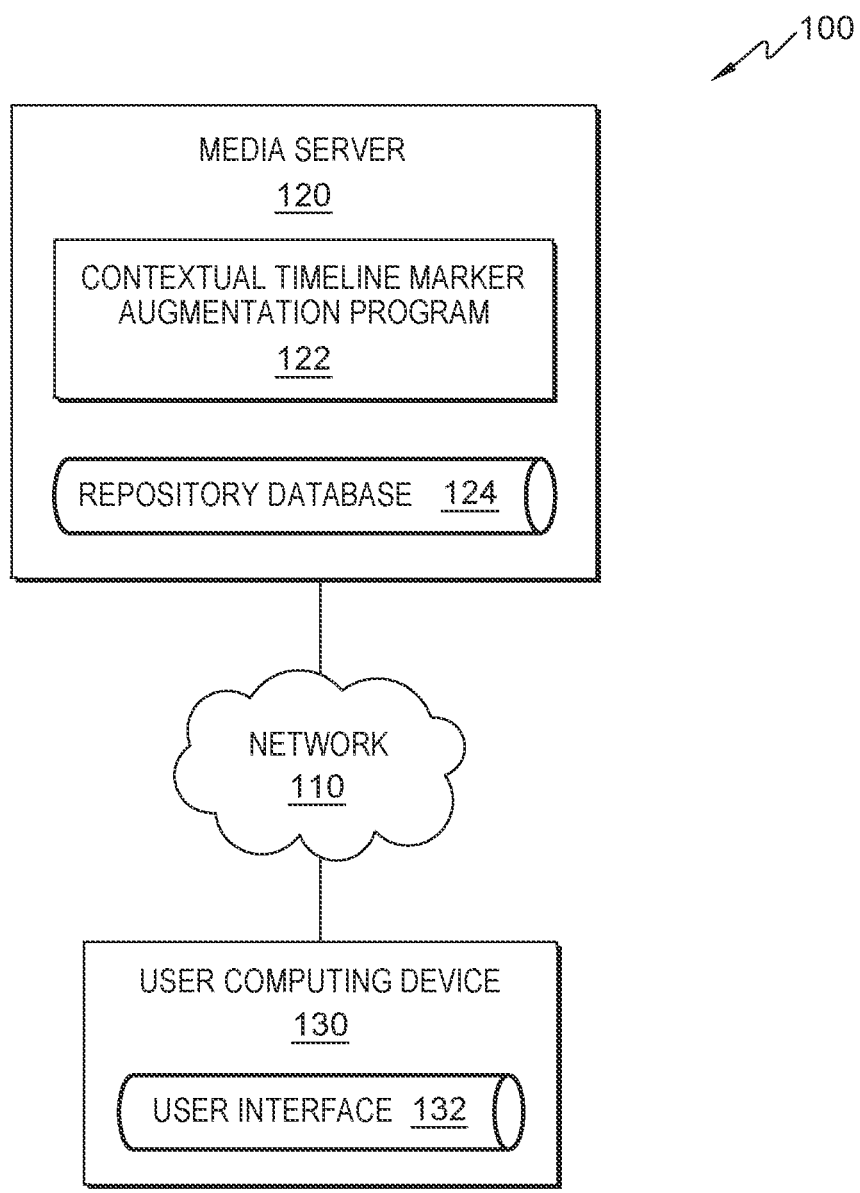
FIG. 1 is a block diagram illustrating a distributed data processing environment, in accordance with an embodiment of the present invention.

FIG. 1 is a functional block diagram illustrating a distributed data processing environment, generally designated 100, in accordance with an embodiment of the present invention. In the depicted embodiment, distributed data processing environment 100 includes media server 120 and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between media server 120, user computing device 130, and other computing devices (not shown) within distributed data processing environment 100.

Media server 120 operates to run contextual timeline marker augmentation program 122 and to send and/or store data in repository database 124. In an embodiment, media server 120 can send data from repository database 124 to user computing device 130. In an embodiment, media server 120 can receive data in repository database 124 from user computing device 130. In one or more embodiments, media server 120 can be a standalone computing device, a management server, a web server, a mobile computing device, or any other electronic device or computing system capable of receiving, sending, and processing data and capable of communicating with user computing device 130 via network 110. In one or more embodiments, media server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, media server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Media server 120 may include internal and external hardware components, as depicted and described in further detail in FIG. 7.

Contextual timeline marker augmentation program 122 operates to extend a virtual meeting to a post-meeting setting, where one or more nonparticipants who were unable to join the virtual meeting can contribute ideas and opinions and can ask questions of the virtual meeting chair, while still maintaining the context of the conversation. In the depicted embodiment, contextual timeline marker augmentation program 122 is a standalone program. In another embodiment, contextual timeline marker augmentation program 122 may be integrated into another software product, such as a virtual meeting software product. In the depicted embodiment, contextual timeline marker augmentation program 122 resides on media server 120. In another embodiment, contextual timeline marker augmentation program 122 may reside on user computing device 130 or on another computing device (not shown), provided that contextual timeline marker augmentation program 122 has access to network 110.

In an embodiment, the user of user computing device 130 registers with media server 120. For example, the user completes a registration process (e.g., user validation), provides information to create a user profile, and authorizes the collection, analysis, and distribution (i.e., opts-in) of relevant data on identified computing devices (e.g., on user computing device 130) by media server 120 (e.g., via contextual timeline marker augmentation program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information; and specifications pertaining to the software or hardware of the user's device.

In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in repository database 124.

Figure 2:
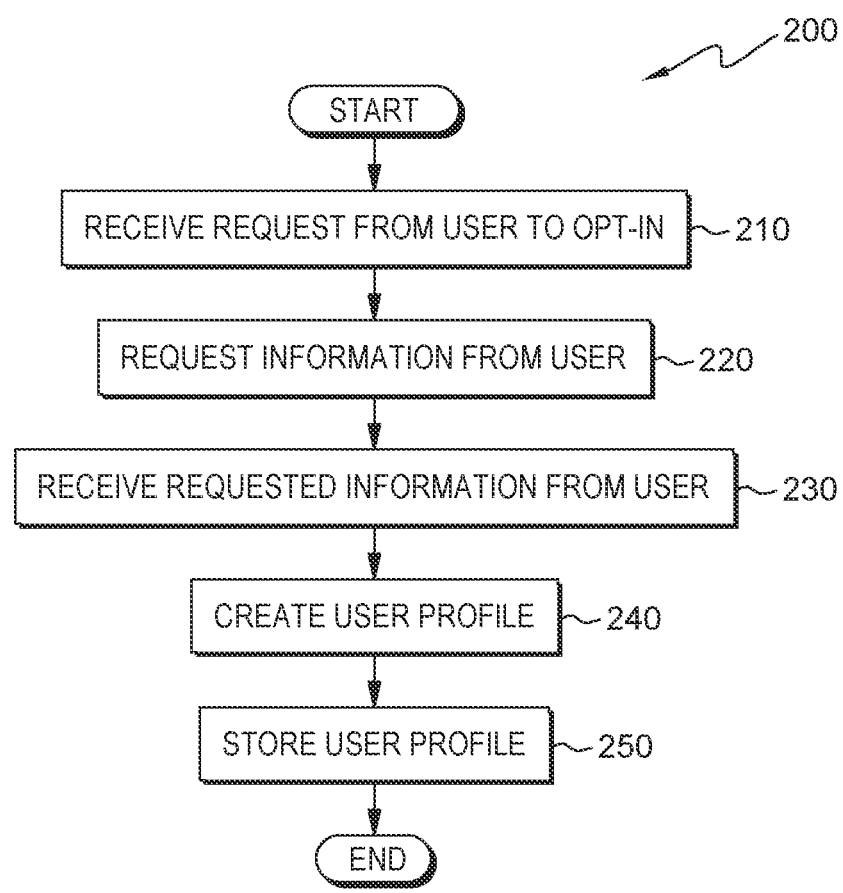
FIG. 2 is a flowchart illustrating the operational steps for a setup component of a contextual timeline marker augmentation program, on a media server within the distributed data processing environment of FIG. 1, in accordance with an embodiment of the present invention.

The operational steps of a setup component of contextual timeline marker augmentation program 122 are depicted and described in further detail with respect to FIG. 2. The overall operational steps of contextual timeline marker augmentation program 122 are depicted and described in further detail with respect to FIG. 3. The operational steps of an augmented recording creation component of contextual timeline marker augmentation program 122 are depicted and described in further detail with respect to FIG. 4. The operational steps of an enablement component of contextual timeline marker augmentation program 122 are depicted and described in further detail with respect to FIG. 5. The operational steps of a feedback component of contextual timeline marker augmentation program 122 are depicted and described in further detail with respect to FIG. 6.

Repository database 124 operates as a repository for data received, used, and/or generated by contextual timeline marker augmentation program 122. A database is an organized collection of data. Data includes, but is not limited to, a user profile; information about user preferences; information about alert notification preferences; an augmented recording of a virtual meeting; data from one or more presentation tools used by a virtual meeting chair and/or by one or more participants during the virtual meeting; the text of the virtual meeting; the title for the virtual meeting; the caption for the virtual meeting; the agenda of the virtual meeting; the one or more goals of the virtual meeting; the timeline of the virtual meeting; the plurality of timeline markers added to the timeline of the virtual meeting; relevant meeting meta data; input provided by a nonparticipant regarding the plurality of timeline markers; one or more questions asked by the nonparticipant; relevant post-meeting conversation meta data; feedback from the virtual meeting chair and/or one or more participants on the input provided by a nonparticipant regarding the plurality of timeline markers; recommendations made to the virtual meeting chair; and any other data received, used, and/or generated by contextual timeline marker augmentation program 122.

Repository database 124 can be implemented with any type of device capable of storing data and configuration files that can be accessed and utilized by media server 120, such as a hard disk drive, a database server, or a flash memory. In an embodiment, repository database 124 is accessed by contextual timeline marker augmentation program 122 to store and/or to access the data. In the depicted embodiment, repository database 124 resides on media server 120. In another embodiment, repository database 124 may reside on another computing device, server, cloud server, or spread across multiple devices elsewhere (not shown) within distributed data processing environment 100, provided that contextual timeline marker augmentation program 122 has access to repository database 124.

The present invention may contain various accessible data sources, such as repository database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Contextual timeline marker augmentation program 122 enables the authorized and secure processing of personal data.

Contextual timeline marker augmentation program 122 provides informed consent, with notice of the collection of personal and/or confidential company data, allowing the user to opt-in or opt-out of processing personal and/or confidential company data. Consent can take several forms. Opt-in consent can impose on the user the opportunity to take an affirmative action before personal and/or confidential company data is processed. Alternatively, opt-out consent can impose on the user the opportunity to take an affirmative action to prevent the processing of personal and/or confidential company data before personal and/or confidential company data is processed. Contextual timeline marker augmentation program 122 provides information regarding personal and/or confidential company data and the nature (e.g., type, scope, purpose, duration, etc.) of the processing. Contextual timeline marker augmentation program 122 provides the user with copies of stored personal and/or confidential company data. Contextual timeline marker augmentation program 122 allows the correction or completion of incorrect or incomplete personal and/or confidential company data. Contextual timeline marker augmentation program 122 allows for the immediate deletion of personal and/or confidential company data.

User computing device 130 operates to run user interface 132 through which a user can interact with contextual timeline marker augmentation program 122 on media server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with contextual timeline marker augmentation program 122 via network 110. In general, user computing device 130 represents any programmable electronic device or a combination of programmable electronic devices capable of executing machine readable program instructions and communicating with other computing devices (not shown) within distributed data processing environment 100 via network 110. User computing device 130 may include components as described in further detail in FIG. 7.

User interface 132 operates as a local user interface between contextual timeline marker augmentation program 122 on media server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from contextual timeline marker augmentation program 122 to a user via network 110. User interface 132 can also display or present alerts including information (such as graphics, text, and/or sound) sent from contextual timeline marker augmentation program 122 to a user via network 110. In an embodiment, user interface 132 is capable of sending and receiving data (i.e., to and from contextual timeline marker augmentation program 122 via network 110, respectively). Through user interface 132, a user can opt-in to contextual timeline marker augmentation program 122; create a user profile; set user preferences and alert notification preferences; input information; input, utilize, and/or receive one or more presentation tools during the virtual meeting; open and resume the augmented recording of the virtual meeting; provide a required input; participate in a conversation; mark a timeline marker for which an input is required as "complete" or "in progress"; ask the virtual meeting chair a question; request and receive feedback regarding the required input; and receive a request for and input feedback regarding the result.

A user preference is a setting that can be customized for a particular user. A set of default user preferences are assigned to each user of contextual timeline marker augmentation program 122. A user preference editor can be used to update values to change the default user preferences. User preferences that can be customized include, but are not limited to, general user system settings, specific user profile settings for contextual timeline marker augmentation program 122, alert notification settings, and machine-learned data collection/storage settings.

Specific user profile settings include, but are not limited to, a tailored alert notification. Contextual timeline marker augmentation program 122 delivers the amount of contextual content required by the user, based on the user's personal preferences. The amount of contextual content required by the user varies, but may be an unabridged content comparison (i.e., the complete text that has not been cut or shortened in any form or manner), an abridged content comparison (i.e., a piece of content that is shortened but does not lose the central points), a summary content comparison (i.e., a paragraph style summary that conveys all of the points in summary format), or an executive summary of content comparison (i.e., a very short summary about 3 to 5 sentences in length).

Machine-learned data is a user's personalized corpus of data. Machine-learned data includes, but is not limited to, data regarding past results of iterations of contextual timeline marker augmentation program 122 and a user's previous response to an alert notification sent by contextual timeline marker augmentation program 122. Contextual timeline marker augmentation program 122 self-learns by tracking user activity and improves with each iteration of contextual timeline marker augmentation program 122. By retaining such data, contextual timeline marker augmentation program 122 ensures that repetitive information is not generated and sent to the user. Instead, contextual timeline marker augmentation program 122 bypasses the repetitive information and locates new information for the user.

FIG. 2 is a flowchart, generally designated 200, illustrating the operational steps for a setup component of contextual timeline marker augmentation program 122 on media server 120 in distributed data processing environment 100, such as the one depicted in FIG. 1, in accordance with an embodiment of the present invention. In an embodiment, contextual timeline marker augmentation program 122 completes a one-time setup with a user. The one-time setup allows for contextual timeline marker augmentation program 122 to capture relevant information about the user to create a user profile. In an embodiment, contextual timeline marker augmentation program 122 receives a request from the user to opt-in. In an embodiment, contextual timeline marker augmentation program 122 requests information from the user. In an embodiment, contextual timeline marker augmentation program 122 receives the requested information from the user. In an embodiment, contextual timeline marker augmentation program 122 creates a user profile. In an embodiment, contextual timeline marker augmentation program 122 stores the user profile. It should be appreciated that the process depicted in FIG. 2 illustrates one possible iteration of the setup component of contextual timeline marker augmentation program 122, which may be repeated for each opt-in request received by contextual timeline marker augmentation program 122.

In step 210, contextual timeline marker augmentation program 122 receives a request from a user to opt-in. A user may include, but is not limited to, an individual who hosts and/or participates in virtual meetings as a means of connecting and communicating with other employees and/or clients and as a means of facilitating meetings and conferences. In an embodiment, contextual timeline marker augmentation program 122 receives a request from a user to opt-in to contextual timeline marker augmentation program 122. In an embodiment, contextual timeline marker augmentation program 122 receives a request from a user to opt-in to contextual timeline marker augmentation program 122 through user interface 132 of user computing device 130. By opting-in, the user agrees to share at least some data with repository database 124.

In step 220, contextual timeline marker augmentation program 122 requests information from the user. In an embodiment, responsive to receiving a request from a user to opt-in, contextual timeline marker augmentation program 122 requests information from the user. In an embodiment, contextual timeline marker augmentation program 122 requests information from the user to create a user profile. In an embodiment, contextual timeline marker augmentation program 122 requests information from the user through user interface 132 of user computing device 130. Information requested from the user includes, but is not limited to, information about user preferences (e.g., general user system settings such as alert notifications for user computing device 130); and information about alert notification preferences (e.g., alert notification preview, alert notification style (i.e., alert notification appearing on lock screen, notification center, and/or banner; alert notification appearing temporary or persistently; alert notification sound on or off; alert notification grouping automatically, by application, or off), and alert notification frequency).

In step 230, contextual timeline marker augmentation program 122 receives the requested information from the user. In an embodiment, responsive to requesting information from the user, contextual timeline marker augmentation program 122 receives the requested information from the user. In an embodiment, contextual timeline marker augmentation program 122 receives the requested information from the user through user interface 132 of user computing device 130.

In step 240, contextual timeline marker augmentation program 122 creates a user profile for the user. In an embodiment, responsive to receiving the requested information from the user, contextual timeline marker augmentation program 122 creates a user profile for the user. In an embodiment, contextual timeline marker augmentation program 122 creates a user profile for the user with information input by the user during setup regarding the user as well as user preferences and alert notification preferences.

In step 250, contextual timeline marker augmentation program 122 stores the user profile. In an embodiment, responsive to creating a user profile, contextual timeline marker augmentation program 122 stores the user profile. In an embodiment, contextual timeline marker augmentation program 122 stores the user profile in a database, e.g., repository database 124.

Figure 3:
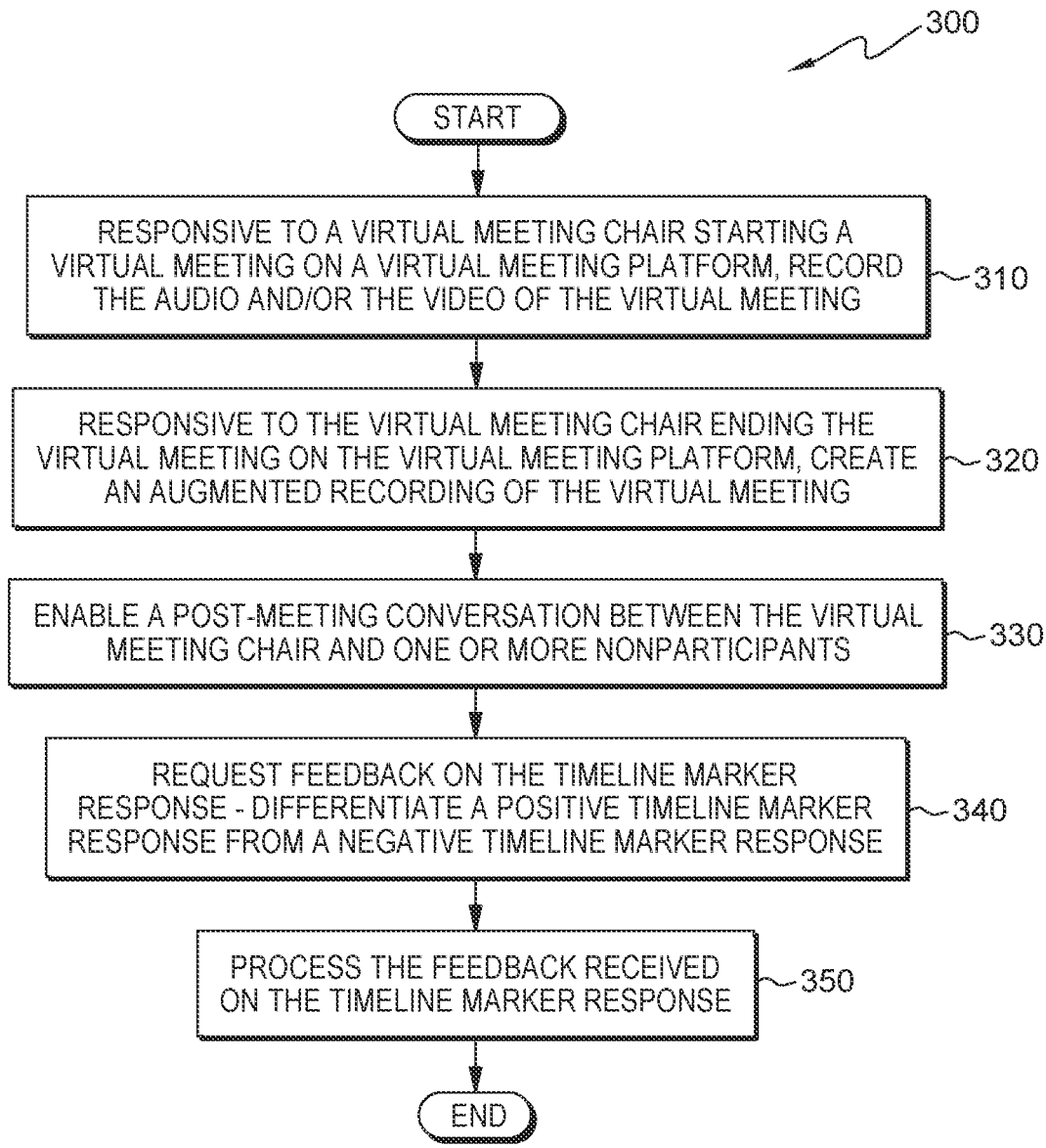
FIG. 3 is a flowchart illustrating the operational steps of the contextual timeline marker augmentation program, on the media server within the distributed data processing environment of FIG. 1, in accordance with an embodiment of the present invention.

FIG. 3 is a flowchart, generally designated 300, illustrating the operational steps of contextual timeline marker augmentation program 122, on media server 120 within distributed data processing environment 100 of FIG. 1, in accordance with an embodiment of the present invention. In an embodiment, contextual timeline marker augmentation program 122 operates to extend a virtual meeting to a post-meeting setting, where one or more nonparticipants who were unable to join the virtual meeting can contribute ideas and opinions and can ask questions of the virtual meeting chair, while still maintaining the context of the conversation. It should be appreciated that the process depicted in FIG. 3 illustrates one possible iteration of the process flow, which may be repeated for each meeting conducted on a virtual meeting platform.

In step 310, responsive to a virtual meeting chair starting a virtual meeting on a virtual meeting platform (e.g., Cisco Webex®, Zoom®, Google Meet®, Microsoft® Teams, etc.), contextual timeline marker augmentation program 122 records the audio and/or the video of the virtual meeting (i.e., the inputs, conversations, and data of the virtual meeting).

In an embodiment, contextual timeline marker augmentation program 122 enables one or more users who were invited to participate in the virtual meeting to join the virtual meeting. The one or more users who were invited to participate and participate in the virtual meeting on the virtual meeting platform are hereinafter referred to as the "one or more participants". The one or more participants ask questions of the virtual meeting chair and participate in the conversation. The one or more users who were invited to participate but do not participate in the virtual meeting on the virtual meeting platform are hereinafter referred to as the "one or more nonparticipants". The one or more nonparticipants review the recording of the virtual meeting and continue the contextual conversation of the virtual meeting after the virtual meeting has concluded.

In an embodiment, contextual timeline marker augmentation program 122 receives an input from the virtual meeting chair in the format of one or more presentation tools (e.g., Microsoft® PowerPoint slides, Microsoft® Excel files, spreadsheets, web pages, diagrams, flowcharts, etc.). The input from the virtual meeting chair includes, but is not limited to, an agenda, a set of goals, a topic of conversation, a solution to the topic of conversation, and a presentation.

In an embodiment, contextual timeline marker augmentation program 122 enables the virtual meeting chair to present the input to the one or more participants. In an embodiment, contextual timeline marker augmentation program 122 enables the virtual meeting chair to utilize the one or more presentation tools during the virtual meeting. In another embodiment, contextual timeline marker augmentation program 122 enables the one or more participants to utilize the one or more presentation tools during the virtual meeting.

In an embodiment, contextual timeline marker augmentation program 122 receives an input from the one or more participants as the virtual meeting chair is presenting. In an embodiment, contextual timeline marker augmentation program 122 receives an input from the one or more participants in the format of a verbal response or a non-verbal response (e.g., sending a chat message or sending an emoji that corresponds to a participant's reaction to the virtual meeting chair's presentation). The input from the one or more participants includes, but is not limited to, a response to a question asked by the virtual meeting chair (e.g., agree or disagree plus an explanation), a question for the virtual meeting chair to answer, and a statement on the topic of conversation.

In an embodiment, contextual timeline marker augmentation program 122 stores the recording of the audio and/or the video of the virtual meeting in a database, e.g., repository database 124 of media server 120. In an embodiment, contextual timeline marker augmentation program 122 stores data from the one or more presentation tools used by the virtual meeting chair and/or the one or more participants during the virtual meeting in a database, e.g., repository database 124 of media server 120.

In step 320, responsive to the virtual meeting chair ending the virtual meeting on the virtual meeting platform, in some situations, without a formal conclusion, contextual timeline marker augmentation program 122 creates an augmented recording of the virtual meeting. How contextual timeline marker augmentation program 122 creates the augmented recording is described in further detail with respect to Flowchart 400 in FIG. 4. In an embodiment, contextual timeline marker augmentation program 122 stores the augmented recording of the virtual meeting in a database, e.g., repository database 124 of media server 120.

In step 330, contextual timeline marker augmentation program 122 enables a post-meeting conversation between the virtual meeting chair and the one or more nonparticipants. In an embodiment, responsive to creating an augmented recording of the virtual meeting, contextual timeline marker augmentation program 122 enables the post-meeting conversation between the virtual meeting chair and the one or more nonparticipants. How contextual timeline marker augmentation program 122 enables the post-meeting conversation is described in further detail with respect to Flowchart 500 in FIG. 5.

In step 340, contextual timeline marker augmentation program 122 requests feedback on the timeline marker response. In an embodiment, responsive to enabling the post-meeting conversation between the virtual meeting chair and the one or more nonparticipants, contextual timeline marker augmentation program 122 requests feedback on the timeline marker response. In an embodiment, contextual timeline marker augmentation program 122 differentiates a positive timeline marker response from a negative timeline marker response. How contextual timeline marker augmentation program 122 requests feedback is described in further detail with respect to Flowchart 600 in FIG. 6.

In step 350, contextual timeline marker augmentation program 122 processes the feedback received on the timeline marker response. In an embodiment, responsive to requesting feedback on the timeline marker response, contextual timeline marker augmentation program 122 processes the feedback received on the timeline marker response. In an embodiment, contextual timeline marker augmentation program 122 incorporates a positive timeline marker response into the augmented recording of the virtual meeting. In an embodiment, contextual timeline marker augmentation program 122 discards a negative timeline marker response. In an embodiment, contextual timeline marker augmentation program 122 stores the positive timeline marker response in a database, e.g., repository database 124 of media server 120. In an embodiment, contextual timeline marker augmentation program 122 stores the relevant meeting meta data in a database, e.g., repository database 124 of media server 120.

In an embodiment, contextual timeline marker augmentation program 122 makes a recommendation to the virtual meeting chair on how to improve the content of the conversation (i.e., how to improve the presentation of a topic of conversation of the virtual meeting in general). In another embodiment, contextual timeline marker augmentation program 122 makes a recommendation to the virtual meeting chair on the one or more parts of the video of the virtual meeting that need to be edited because of a clustering of similar question and answers. In an embodiment, contextual timeline marker augmentation program 122 stores the recommendations made to the virtual meeting chair in a database, e.g., repository database 124 in media server 120.

In an embodiment, contextual timeline marker augmentation program 122 leverages conversation sentiments to make a recommendation to the virtual meeting chair on how to improve the content of the conversation. In another embodiment, contextual timeline marker augmentation program 122 leverages direct suggestions from the one or more participants to make a recommendation to the virtual meeting chair on how to improve the content of the conversation. In another embodiment, contextual timeline marker augmentation program 122 leverages an intelligent threshold on the relevant timeline markers to make a recommendation to the virtual meeting chair on how to improve the content of the conversation.

In an embodiment, contextual timeline marker augmentation program 122 enables the virtual meeting chair to incorporate the recommendations. In another embodiment, contextual timeline marker augmentation program 122 enables the virtual meeting chair to edit the augmented recording to remove the one or more parts of the augmented recording of the virtual meeting where there was clustering of similar questions and answers.

In an embodiment, contextual timeline marker augmentation program 122 identifies noise in the augmented recording. In an embodiment, contextual timeline marker augmentation program 122 removes the noise from the augmented recording. The noise includes, but is not limited to, questions, answers, and related conversations that are not relevant to the collaboration context. Content noise reduction/elimination is a recurring process throughout the lifecycle of a collaboration video.

In an embodiment, contextual timeline marker augmentation program 122 compares the augmented recording of the virtual meeting to the text of the virtual meeting after the virtual meeting chair has edited the augmented recording. In an embodiment, contextual timeline marker augmentation program 122 identifies one or more sections of the virtual meeting where one or more questions have been answered. In an embodiment, contextual timeline marker augmentation program 122 removes the one or more answered questions from the edited video of the virtual meeting. In an embodiment, contextual timeline marker augmentation program 122 retains the one or more unanswered questions, so that the one or more unanswered questions can be readdressed at a later time.

Figure 4:
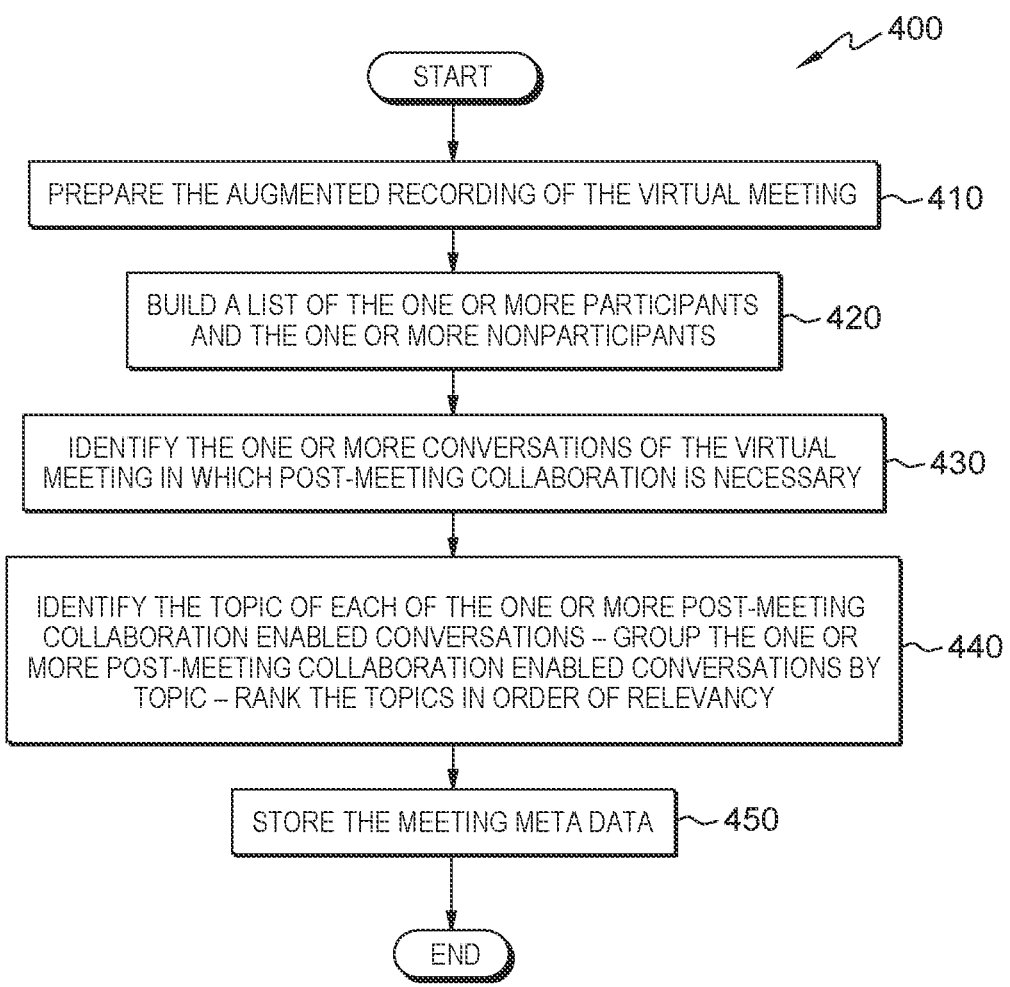
FIG. 4 is a flowchart illustrating, in greater detail, the operational steps of an augmented recording creation component of the contextual timeline marker augmentation program, on the media server within the distributed data processing environment of FIG. 1, in accordance with an embodiment of the present invention.

FIG. 4 is a flowchart, generally designated 400, illustrating, in greater detail, the operational steps of an augmented recording creation component (e.g., step 320) of contextual timeline marker augmentation program 122 on media server 120 within distributed data processing environment of FIG. 1, in accordance with an embodiment of the present invention. In an embodiment, contextual timeline marker augmentation program 122 operates to augment the recording of the virtual meeting with a plurality of timeline markers. It should be appreciated that the process depicted in FIG. 4 illustrates one possible iteration of the augmented recording creation component of contextual timeline marker augmentation program 122, which may be repeated for each meeting conducted on the virtual meeting platform.

In step 410, contextual timeline marker augmentation program 122 prepares the augmented recording of the virtual meeting. In an embodiment, contextual timeline marker augmentation program 122 converts the augmented recording of the virtual meeting to text. In an embodiment, contextual timeline marker augmentation program 122 stores the text of the virtual meeting in a database, e.g., repository database 124 of media server 120.

In an embodiment, contextual timeline marker augmentation program 122 creates a title for the virtual meeting. In an embodiment, contextual timeline marker augmentation program 122 stores the title for the virtual meeting in a database, e.g., repository database 124 of media server 120. In an embodiment, contextual timeline marker augmentation program 122 creates a caption for the virtual meeting. The caption includes a brief explanation of the conversation that occurred during the virtual meeting. In an embodiment, contextual timeline marker augmentation program 122 stores the caption for the virtual meeting in a database, e.g., repository database 124 of media server 120. In an embodiment, contextual timeline marker augmentation program 122 links the title and the caption for the virtual meeting to the text of the virtual meeting.

In an embodiment, contextual timeline marker augmentation program 122 integrates a timeline into the text of the virtual meeting. The timeline is a display of a plurality of timestamps in chronological order. A timestamp from the plurality of timestamps is hereinafter referred to as a timeline marker. The timeline marker is associated either with a conversation that occurs during the virtual meeting at a particular contextual conversation point or with a conversation that occurs after the virtual meeting. The timeline marker assists the one or more participants and the one or more nonparticipants in identifying the particular point of the virtual meeting at which a specific conversation occurred (i.e., a particular contextual conversation point). The timeline marker permits contextual timeline marker augmentation program 122 to jump to the particular contextual conversation point. The timeline marker is hashed in a "repository service". The hash value can be embedded with hyperlinks that can then be used in another channel such as a web page, an email, or a social media page. When a user clicks on the hashed hyperlink, the video of the virtual meeting is opened and automatically scrolled to the particular point of the virtual meeting at which the specific conversation occurred. In an embodiment, contextual timeline marker augmentation program 122 stores the timeline of the virtual meeting and the plurality of timeline markers in a database, e.g., repository database 124 of media server 120.

In an embodiment, contextual timeline marker augmentation program 122 tags the augmented recording of the virtual meeting with a plurality of timeline markers. In an embodiment, contextual timeline marker augmentation program 122 tags the text of the virtual meeting with a plurality of timeline markers.

In step 420, contextual timeline marker augmentation program 122 identifies the one or more participants and the one or more nonparticipants of the virtual meeting. In an embodiment, responsive to preparing the augmented recording of the virtual meeting, contextual timeline marker augmentation program 122 identifies the one or more participants and the one or more nonparticipants of the virtual meeting. In an embodiment, contextual timeline marker augmentation program 122 identifies the one or more participants and the one or more nonparticipants of the virtual meeting through information gathered from the virtual meeting platform (e.g., from a participant list or from an attendance report). In an embodiment, contextual timeline marker augmentation program 122 builds a list consisting of the one or more participants and the one or more nonparticipants.

In an embodiment, contextual timeline marker augmentation program 122 designates the virtual meeting chair. The virtual meeting chair is the host of the virtual meeting on the virtual meeting platform. The virtual meeting chair presents an agenda during the virtual meeting. The virtual meeting chair publishes the agenda of the virtual meeting, the minutes of the virtual meeting, the open points of conversation during the virtual meeting, and the conclusion of the virtual meeting.

In step 430, contextual timeline marker augmentation program 122 identifies the one or more conversations of the virtual meeting in which post-meeting collaboration is necessary. In an embodiment, responsive to identifying the one or more participants and the one or more nonparticipants of the virtual meeting, contextual timeline marker augmentation program 122 identifies the one or more conversations of the virtual meeting in which post-meeting collaboration is necessary. The one or more conversations of the virtual meeting in which post-meeting collaboration is necessary are the one or more conversations of the virtual meeting that contain one or more incomplete tasks, e.g., votes on a specific item are needed from non-participants of the virtual meeting.

In an embodiment, contextual timeline marker augmentation program 122 identifies the one or more conversations of the virtual meeting that are explicitly labeled as "post-meeting collaboration enabled" by the one or more participants. In another embodiment, contextual timeline marker augmentation program 122 identifies the one or more conversations of the virtual meeting that can be labeled as "post-meeting collaboration enabled" based on one or more factors of the conversation. The one or more factors of a specific conversation that make the conversation "post-meeting collaboration enabled" include, but are not limited to, the one or more participants, the one or more nonparticipants, the duration of the virtual meeting, the expiration of the virtual meeting, and the length of time post-meeting collaboration can be supported.

In an embodiment, contextual timeline marker augmentation program 122 labels the one or more conversations of the virtual meeting in which a post-meeting collaboration is necessary as "post-meeting collaboration enabled" (hereinafter referred to as the "one or more post-meeting collaboration enabled conversations").

In an embodiment, contextual timeline marker augmentation program 122 sets post-meeting collaboration parameters. Post-meeting collaboration parameters include, but are not limited to, the designation of the one or more nonparticipants and the length of time post-meeting collaboration will be supported.

In step 440, contextual timeline marker augmentation program 122 identifies the topic of each of the one or more post-meeting collaboration enabled conversations. In an embodiment, responsive to identifying the one or more conversations of the virtual meeting in which post-meeting collaboration is necessary, contextual timeline marker augmentation program 122 identifies the topic of each of the one or more post-meeting collaboration enabled conversations. In an embodiment, contextual timeline marker augmentation program 122 identifies the topic of each of the one or more post-meeting collaboration enabled conversations through a common entity extraction method. In another embodiment, contextual timeline marker augmentation program 122 identifies the topic of each of the one or more post-meeting collaboration enabled conversations through the captions and/or the highlights of the virtual meeting.

In an embodiment, contextual timeline marker augmentation program 122 groups the one or more post-meeting collaboration enabled conversations by topic. In another embodiment, contextual timeline marker augmentation program 122 groups the one or more post-meeting collaboration enabled conversations by trending topics and non-trending topics.

In an embodiment, contextual timeline marker augmentation program 122 highlights the topics of the one or more post-meeting collaboration enabled conversations that are relevant to the one or more conversations of the virtual meeting. In an embodiment, contextual timeline marker augmentation program 122 highlights the timeline markers associated with the highlighted topics. Relevancy is based on how closely connected a topic of the one or more post-meeting collaboration enabled conversations is to what was discussed during the one or more conversations of the virtual meeting (e.g., how closely connected a topic is to the agenda of the virtual meeting or to the one or more goals of the virtual meeting).

In an embodiment, contextual timeline marker augmentation program 122 tags the highlighted relevant topics and the timeline markers associated with the highlighted relevant topics with the topic entity. In another embodiment, contextual timeline marker augmentation program 122 tags the highlighted relevant topics and the timeline markers associated with the highlighted relevant topics with the identification of the one or more participants who introduced the relevant topic during the virtual meeting. In another embodiment, contextual timeline marker augmentation program 122 tags the highlighted relevant topics and the timeline markers associated with the highlighted relevant topics with the identification of the one or more nonparticipants who are required to provide an input in order to complete the conversation.

In an embodiment, contextual timeline marker augmentation program 122 ranks the highlighted relevant topics and the timeline markers associated with the highlighted relevant topics in order of relevancy (i.e., from highly relevant to least relevant). In an embodiment, contextual timeline marker augmentation program 122 elevates the highlighted relevant topics and the timeline markers associated with the highlighted relevant topics to a higher-ranking position.

In step 450, contextual timeline marker augmentation program 122 stores the meeting meta data. In an embodiment, responsive to identifying the topic of each of the one or more post-meeting collaboration enabled conversations, contextual timeline marker augmentation program 122 stores the meeting meta data. In an embodiment, contextual timeline marker augmentation program 122 stores the meeting meta data in a database, e.g., repository database 124 of media server 120.

Figure 5:
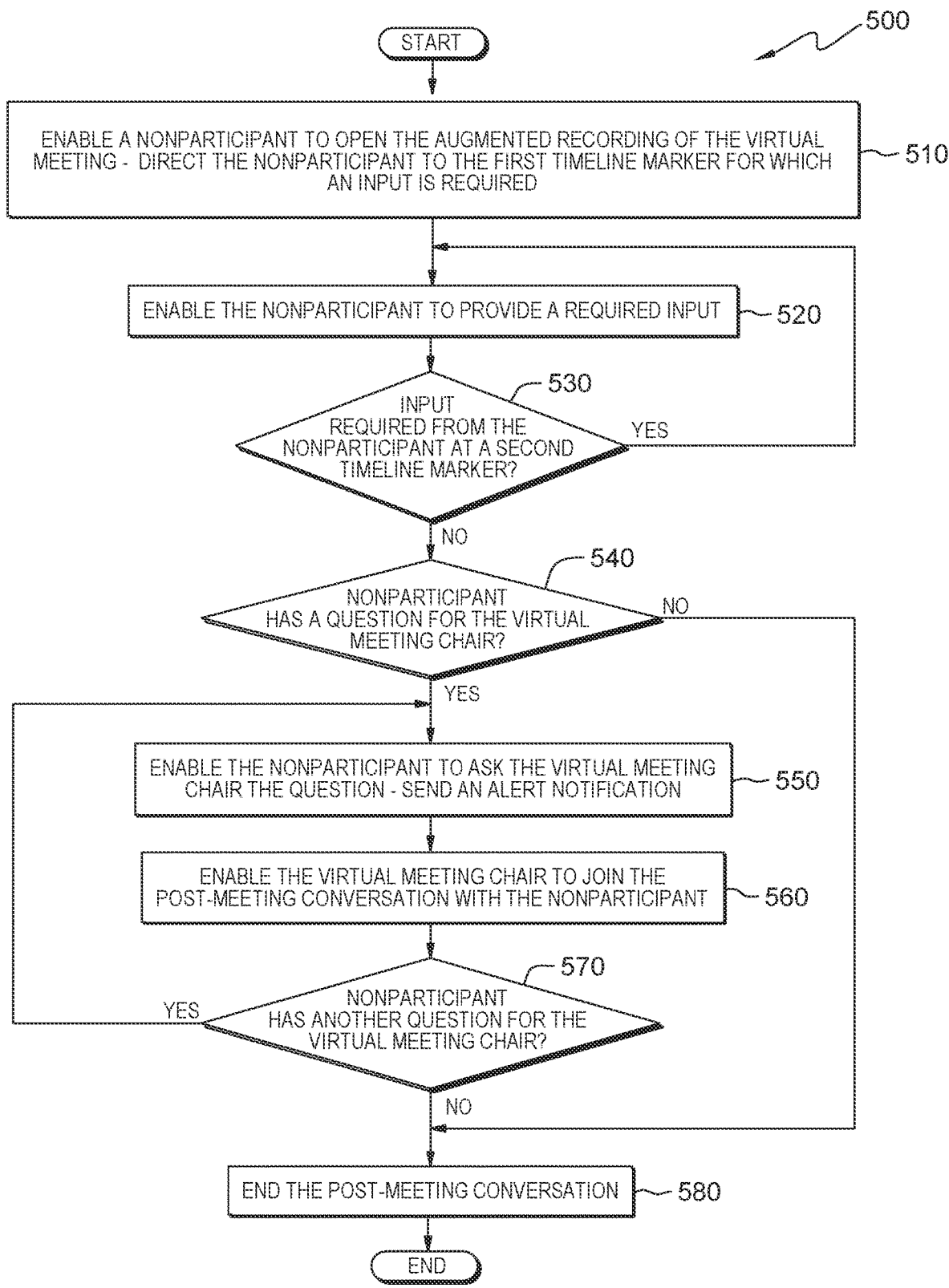
FIG. 5 is a flowchart illustrating, in greater detail, the operational steps of an enablement component of the contextual timeline marker augmentation program, on the media server within the distributed data processing environment of FIG. 1, in accordance with an embodiment of the present invention.

FIG. 5 is a flowchart, generally designated 500, illustrating, in greater detail, the operational steps of an enablement component (e.g., step 330) of contextual timeline marker augmentation program 122 on media server 120 within distributed data processing environment of FIG. 1, in accordance with an embodiment of the present invention. In an embodiment, the enablement component of contextual timeline marker augmentation program 122 operates to enable a post-meeting conversation between the virtual meeting chair and the one or more nonparticipants. It should be appreciated that the process depicted in FIG. 5 illustrates one possible iteration of the enablement component of contextual timeline marker augmentation program 122, which may be repeated for each meeting conducted on the virtual meeting platform.

In step 510, contextual timeline marker augmentation program 122 enables a nonparticipant to open the augmented recording of the virtual meeting. In an embodiment, contextual timeline marker augmentation program 122 retrieves the augmented recording of the virtual meeting from a database, e.g., repository database 124 of media server 120.

In an embodiment, contextual timeline marker augmentation program 122 enables the nonparticipant to resume the augmented recording of the virtual meeting. In an embodiment, contextual timeline marker augmentation program 122 integrates the nonparticipant into the augmented recording of the virtual meeting as a virtual participant. In an embodiment, contextual timeline marker augmentation program 122 displays the avatar of the nonparticipant in the augmented recording of the virtual meeting. The avatar of the nonparticipant includes an image of the nonparticipant as well as information gathered from the corporate profile of the nonparticipant. Information gathered from the corporate profile of the nonparticipant includes, but is not limited to, the hierarchy of the nonparticipant's corporation, the nonparticipant's position in the corporation's hierarchy, the nonparticipant's seniority in the nonparticipant's corporation, the nonparticipant's primary job, the nonparticipant's primary job functions, the nonparticipant's technology interests, and the nonparticipant's domain expertise. The corporate profile of the nonparticipant is stored in a database, e.g., repository database 124 of media server 120.

In an embodiment, contextual timeline marker augmentation program 122 provides the nonparticipant with the agenda of the virtual meeting. In an embodiment, contextual timeline marker augmentation program 122 provides the nonparticipant with the agenda of the virtual meeting so that the nonparticipant understands what topics were covered during the virtual meeting. In an embodiment, contextual timeline marker augmentation program 122 retrieves the agenda of the virtual meeting stored in a database, e.g., repository database 124 of media server 120.

In an embodiment, contextual timeline marker augmentation program 122 provides the nonparticipant with the one or more goals of the virtual meeting. The one or more goals of the virtual meeting are extracted from the agenda or derived from the clustered topics. In an embodiment, contextual timeline marker augmentation program 122 provides the nonparticipant with the one or more goals of the virtual meeting so that the nonparticipant understands what input is required of the nonparticipant and how the input of the nonparticipant will contribute to completing the one or more goals of the virtual meeting. In an embodiment, contextual timeline marker augmentation program 122 retrieves the one or more goals of the virtual meeting stored in a database, e.g., repository database 124 of media server 120.

In an embodiment, contextual timeline marker augmentation program 122 provides the nonparticipant with the text of the virtual meeting. In an embodiment, contextual timeline marker augmentation program 122 retrieves the text of the virtual meeting stored in a database, e.g., repository database 124 of media server 120. In an embodiment, contextual timeline marker augmentation program 122 provides the nonparticipant with the caption of the virtual meeting. In an embodiment, contextual timeline marker augmentation program 122 retrieves the caption for the virtual meeting stored in a database, e.g., repository database 124 of media server 120.

In an embodiment, contextual timeline marker augmentation program 122 highlights the relevant topics of the one or more post-meeting collaboration enabled conversations and the timeline markers associated with the highlighted relevant topics in the text of the virtual meeting. In an embodiment, contextual timeline marker augmentation program 122 highlights the timeline markers for which an input is required from the nonparticipant and the associated question in the text of the virtual meeting.

In an embodiment, contextual timeline marker augmentation program 122 directs the nonparticipant to the first timeline marker for which an input is required from the nonparticipant and to the associated question in the text of the virtual meeting.

In an embodiment, contextual timeline marker augmentation program 122 automatically responds to the associated question with a recommended response when a similar question or the same question had previously been asked and answered. In another embodiment, contextual timeline marker augmentation program 122 displays one or more previously answered questions that are similar to the associated question. In an embodiment, contextual timeline marker augmentation program 122 displays the answers to the previously answered questions.

In step 520, contextual timeline marker augmentation program 122 enables the nonparticipant to provide a required input. In an embodiment, responsive to enabling a nonparticipant to open the virtual meeting, contextual timeline marker augmentation program 122 enables the nonparticipant to provide the required input (e.g., to respond to the question raised during the virtual meeting or to provide input on a conversation that occurred during the virtual meeting). In an embodiment, contextual timeline marker augmentation program 122 enables the nonparticipant to accept the recommended response to the associated question. In another embodiment, contextual timeline marker augmentation program 122 enables the nonparticipant to reject the recommended response and to provide an independent response to the associated question.

In another embodiment, contextual timeline marker augmentation program 122 enables the nonparticipant to participate in a conversation on an identified relevant topic (e.g., to provide an input on a topic discussed during the virtual meeting). In another embodiment, contextual timeline marker augmentation program 122 enables the nonparticipant to provide feedback on a conversation that occurred during the virtual meeting. In an embodiment, contextual timeline marker augmentation program 122 captures the required input from the nonparticipant.

In an embodiment, contextual timeline marker augmentation program 122 enables the nonparticipant to mark the first timeline marker for which an input is required as "complete". When the first timeline marker for which an input is required is marked as "complete", contextual timeline marker augmentation program 122 restricts the nonparticipant and any other nonparticipants from providing further input. In another embodiment, contextual timeline marker augmentation program 122 enables the nonparticipant to mark the first timeline marker for which an input is required as "in progress". When the first timeline marker for which an input is required is marked as "in progress", contextual timeline marker augmentation program 122 enables the nonparticipant and any other nonparticipants to continue to provide further input.

In decision 530, contextual timeline marker augmentation program 122 determines whether an input is required from the nonparticipant at a second timeline marker. In an embodiment, responsive to enabling the nonparticipant to provide the required input, contextual timeline marker augmentation program 122 determines whether an input is required from the nonparticipant at a second timeline marker.

If contextual timeline marker augmentation program 122 determines an input is required from the nonparticipant at a second timeline marker (decision 530, YES branch), then contextual timeline marker augmentation program 122 returns to step 520, enabling the nonparticipant to provide the required input (i.e., for the second timeline marker). In an embodiment, contextual timeline marker augmentation program 122 directs the nonparticipant to the second timeline marker after the nonparticipant provides an input on the first timeline marker. In an embodiment, contextual timeline marker augmentation program 122 enables the nonparticipant to move from the first timeline marker to a second timeline marker independently regardless of the completion of the required input of the first timeline marker.

If contextual timeline marker augmentation program 122 determines an input is not required from the nonparticipant at a second timeline marker (decision 530, NO branch), then contextual timeline marker augmentation program 122 proceeds to step 540, determining whether the nonparticipant has a question for the virtual meeting chair.

In decision 540, contextual timeline marker augmentation program 122 determines whether the nonparticipant has a question for the virtual meeting chair. In an embodiment, responsive to determining an input is not required from the nonparticipant at a second timeline marker, contextual timeline marker augmentation program 122 determines whether the nonparticipant has a question for the virtual meeting chair. If contextual timeline marker augmentation program 122 determines the nonparticipant has a question for the virtual meeting chair (decision 540, YES branch), then contextual timeline marker augmentation program 122 proceeds to step 550, enabling the nonparticipant to ask the virtual meeting chair the question. If contextual timeline marker augmentation program 122 determines the nonparticipant does not have a question for the virtual meeting chair (decision 540, NO branch), then contextual timeline marker augmentation program 122 proceeds to step 580, ending the post-meeting conversation.

In step 550, contextual timeline marker augmentation program 122 enables the nonparticipant to ask the virtual meeting chair the question. In an embodiment, responsive to determining the nonparticipant has a question for the virtual meeting chair, contextual timeline marker augmentation program 122 enables the nonparticipant to ask the virtual meeting chair the question.

In an embodiment, contextual timeline marker augmentation program 122 converts the question to text. In an embodiment, contextual timeline marker augmentation program 122 derives the context of the question using natural language processing. In an embodiment, contextual timeline marker augmentation program 122 saves the text and the context of the question in a database, e.g., repository database 124 of media server 120.

In an embodiment, contextual timeline marker augmentation program 122 places the avatar of the nonparticipant at the particular contextual conversation point when the nonparticipant asks the virtual meeting chair the question. In an embodiment, contextual timeline marker augmentation program 122 places the avatar of the nonparticipant at the particular contextual conversation point so that the virtual meeting chair, the one or more participants, and the other nonparticipants can visualize the virtual presence of the nonparticipant asking the question.

In an embodiment, contextual timeline marker augmentation program 122 creates a new timeline marker. In an embodiment, contextual timeline marker augmentation program 122 creates a new timeline marker representative of the question the nonparticipant asked the virtual meeting chair. In an embodiment, contextual timeline marker augmentation program 122 adds the new timeline marker to the timeline at the particular contextual conversation point most relevant to the context of the question the nonparticipant asked the virtual meeting chair. In an embodiment, contextual timeline marker augmentation program 122 stores the new timeline marker in a database, e.g., repository database 124 of media server 120.

In an embodiment, contextual timeline marker augmentation program 122 sends an alert notification. In an embodiment, contextual timeline marker augmentation program 122 sends an alert notification to the virtual meeting chair. In an embodiment, contextual timeline marker augmentation program 122 sends an alert notification regarding the newly added timeline marker.

In step 560, contextual timeline marker augmentation program 122 enables the virtual meeting chair to join the post-meeting collaboration enabled conversations with the nonparticipant. In an embodiment, responsive to enabling the nonparticipant to ask the virtual meeting chair the question, contextual timeline marker augmentation program 122 enables the virtual meeting chair to join the post-meeting collaboration enabled conversations with the nonparticipant. In another embodiment, contextual timeline marker augmentation program 122 enables the virtual meeting chair to respond to the question at a later time.

In an embodiment, contextual timeline marker augmentation program 122 enables the virtual meeting chair to clarify a question so that the nonparticipant understands what input is required. In another embodiment, contextual timeline marker augmentation program 122 enables the virtual meeting chair to answer the question the nonparticipant asked the virtual meeting chair.

In an embodiment, contextual timeline marker augmentation program 122 automatically responds to the question associated with the new timeline marker with a recommended response when a similar question or the same question had previously been asked and answered. In another embodiment, contextual timeline marker augmentation program 122 displays previously answered questions that are similar to the question associated with the new timeline marker. In an embodiment, contextual timeline marker augmentation program 122 displays the answers to previously answered questions.

In an embodiment, contextual timeline marker augmentation program 122 enables the virtual meeting chair to provide the required input (e.g., to clarify or to answer a question). In an embodiment, contextual timeline marker augmentation program 122 enables the virtual meeting chair to accept the recommended response to the question associated with the new timeline marker. In another embodiment, contextual timeline marker augmentation program 122 enables the virtual meeting chair to reject the recommended response and to provide an independent response to the question associated with the new timeline marker.

In an embodiment, contextual timeline marker augmentation program 122 stores the clarification provided by the virtual meeting chair in a database, e.g., repository database 124 of media server 120. In an embodiment, contextual timeline marker augmentation program 122 stores the answer to the question the nonparticipant asked the virtual meeting chair in a database, e.g., repository database 124 of media server 120.

In an embodiment, contextual timeline marker augmentation program 122 tags the answer to the question the nonparticipant asked the virtual meeting chair based on an algorithm.

In decision 570, contextual timeline marker augmentation program 122 determines whether the nonparticipant has another question for the virtual meeting chair. In an embodiment, responsive enabling the virtual meeting chair to join the post-meeting collaboration, contextual timeline marker augmentation program 122 determines whether the nonparticipant has another question for the virtual meeting chair. If contextual timeline marker augmentation program 122 determines the nonparticipant has another question for the virtual meeting chair (decision 570, YES branch), then contextual timeline marker augmentation program 122 returns to step 550, enabling the nonparticipant to ask the virtual meeting chair the question. If contextual timeline marker augmentation program 122 determines the nonparticipant does not have another question for the virtual meeting chair (decision 570, NO branch), then contextual timeline marker augmentation program 122 proceeds to step 580, ending the post-meeting conversation.

In step 580, contextual timeline marker augmentation program 122 ends the post-meeting conversation. In an embodiment, responsive to determining the nonparticipant does not have another question for the virtual meeting chair, contextual timeline marker augmentation program 122 ends the post-meeting conversation. In another embodiment, contextual timeline marker augmentation program 122 ends the post-meeting conversation when the participants and the nonparticipants agree that the goals of the virtual meeting have been met. In another embodiment, contextual timeline marker augmentation program 122 ends the post-meeting conversation when the duration of the post-meeting collaboration expires.

Figure 6:
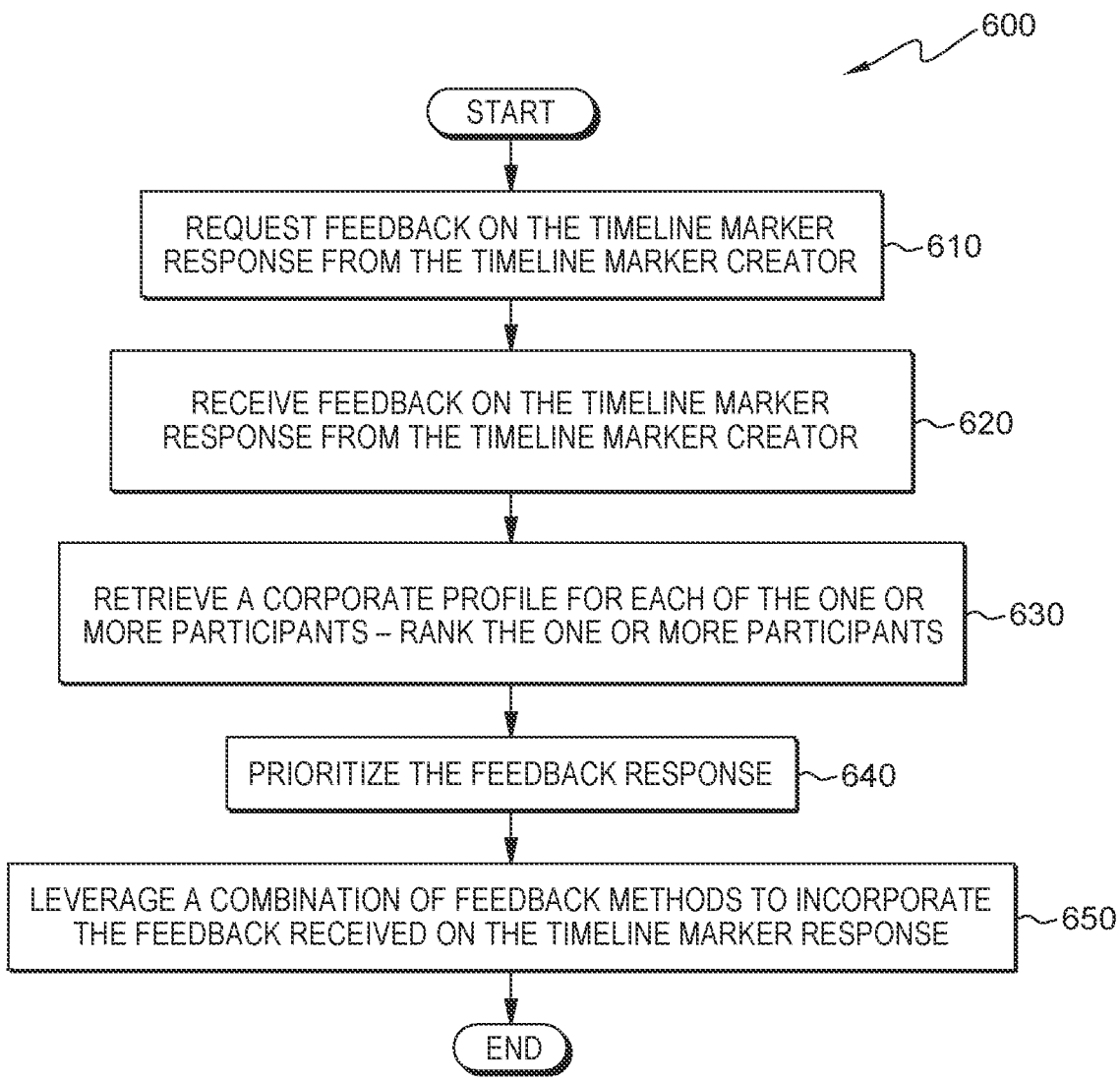
FIG. 6 is a flowchart illustrating, in greater detail, the operational steps of a feedback component of the contextual timeline marker augmentation program, on the media server within the distributed data processing environment of FIG. 1, in accordance with an embodiment of the present invention.

FIG. 6 is a flowchart, generally designated 600, illustrating, in greater detail, the operational steps of a feedback component of contextual timeline marker augmentation program 122, on media server 120 within distributed data processing environment of FIG. 1, in accordance with an embodiment of the present invention. In an embodiment, the feedback component of contextual timeline marker augmentation program 122 operates to request feedback on the timeline marker response, to receive feedback on the timeline marker response, and to differentiate a positive timeline marker response from a negative timeline marker response. It should be appreciated that the process depicted in FIG. 6 illustrates one possible iteration of the feedback component of contextual timeline marker augmentation program 122, which may be repeated for each timeline marker response received.

In step 610, contextual timeline marker augmentation program 122 requests feedback on the timeline marker response from the timeline marker creator. The timeline marker creator may include, but is not limited to, the virtual meeting chair, one of the one or more participants, and one of the one or more nonparticipants. Feedback is provided by means of a vote, by a thumbs up or a thumbs down, or by natural language feedback on which sentiment analysis can be performed. In an embodiment, contextual timeline marker augmentation program 122 requests feedback on the timeline marker response to differentiate a positive response from a negative response. In an embodiment, contextual timeline marker augmentation program 122 differentiates a positive response from a negative response using a prioritization, ranking, and weightage criteria.

In step 620, contextual timeline marker augmentation program 122 receives feedback on the timeline marker response from the timeline marker creator. In an embodiment, responsive to requesting feedback on the timeline marker response from the timeline marker creator, contextual timeline marker augmentation program 122 receives feedback on the timeline marker response from the timeline marker creator.

In step 630, contextual timeline marker augmentation program 122 retrieves a corporate profile for each of the one or more participants. In an embodiment, responsive to receiving feedback on the timeline marker response from the timeline marker creator, contextual timeline marker augmentation program 122 retrieves a corporate profile for each of the one or more participants. In an embodiment, contextual timeline marker augmentation program 122 retrieves a corporate profile for each of the one or more participants from a database, e.g., repository database 124. In an embodiment, contextual timeline marker augmentation program 122 gathers information from each of the one or more participants' corporate profiles. Information gathered from each of the one or more participants' corporate profile includes, but is not limited to, the respective participant's corporate profile, the hierarchy of the participant's corporation, the participant's position in the corporation's hierarchy, the participant's seniority in the participant's corporation, the participant's primary job, the participant's primary job functions, the participant's technology interests, and the participant's domain expertise.

In an embodiment, contextual timeline marker augmentation program 122 ranks the one or more participants based on the corporate profile of the one or more participants. In an embodiment, contextual timeline marker augmentation program 122 determines if a higher ranked participant has provided feedback on the timeline marker response. In an embodiment, contextual timeline marker augmentation program 122 determines if a lower ranked participant has provided feedback on the timeline marker response.

In an embodiment, contextual timeline marker augmentation program 122 determines if the feedback provided by the one or more participant on the timeline marker response was crowdsourced (i.e., determines whether a single feedback response was provided by one participant or by more than one participant).

In step 640, contextual timeline marker augmentation program 122 prioritizes the feedback response. In an embodiment, responsive to retrieving a corporate profile for each of the one or more participants, contextual timeline marker augmentation program 122 prioritizes the feedback response. In an embodiment, contextual timeline marker augmentation program 122 prioritizes the feedback response based on a set of pre-defined priorities and rules. The set of pre-defined priorities, from highest priority to lowest priority, include timeline marker creator, content creator (i.e., virtual meeting chair), corporate hierarchy, participants, nonparticipants, and other participants/other criteria.

In step 650, contextual timeline marker augmentation program 122 leverages a combination of feedback methods. In an embodiment, responsive to prioritizing the feedback response, contextual timeline marker augmentation program 122 leverages a combination of feedback methods. In an embodiment, contextual timeline marker augmentation program 122 leverages a combination of feedback methods to incorporate the feedback received on a timeline marker response including, but not limited to, the number of up votes, the number of down votes, the number of crowd sourcing, the number of likes, and natural language processing sentiment analysis (e.g., detecting the word "thank you" or "agreed"). In an embodiment, contextual timeline marker augmentation program 122 leverages a combination of feedback methods to determine whether the timeline marker response is a positive response or a negative response. A positive timeline marker response is represented by a plurality of up votes, a plurality of likes, and/or a plurality of positive words such as "thank you" or "agreed" which indicate a positive response. A negative timeline marker response is represented by a plurality of down votes, a plurality of dislikes, and/or a plurality of negative words such as "disagreed" which indicate a negative response.

In a first example, Company A hosts a workshop on a virtual meeting platform. Company A invites ten participants to the workshop. Six participants join the workshop on the virtual meeting platform. The host of the workshop presents the topic of conversation and begins the conversation by asking the participants for an argument in support of or an argument against the topic. The host of the workshop expects each participant to contribute an argument in support of or against before the conversation is concluded. The six participants present at the workshop each contribute an argument. Two of the six participants ask the host of the workshop questions on contextual ambiguities. Contextual timeline marker augmentation program 122 captures the questions raised by the two participants and the answer provided by the host of the workshop to only one of the questions. Contextual timeline marker augmentation program 122 stores the questions and answer in repository database 142 of media server 120. Contextual timeline marker augmentation program 122 marks the conversation started by the host of the workshop as an "open conversation" and the question that goes unanswered because of a dependency on a third person who did not attend the workshop as an "open question". The "open conversation" and the "open question" will be completed after the workshop has ended. At a later time, the four nonparticipants are given the agenda of the workshop, the one or more goals of the workshop, the text of the workshop, the relevant topics of the one or more post-meeting collaboration enabled conversations and the timeline markers associated with the highlighted relevant topics to review. Nonparticipant G answers the "open question" and can now mark the "open question" as "complete". Nonparticipant G has a contextual question regarding the topic of the workshop. Nonparticipant G asks the host of the workshop the contextual question. Contextual timeline marker augmentation program 122 sends the host of the workshop an alert notification regarding Nonparticipant G's contextual question. The host of the workshop rejoins the workshop and answers Nonparticipant G's contextual question. The turnaround time to answer Nonparticipant G's question is significantly reduced.

In a second example, Teacher B hosts a class on a virtual meeting platform every Tuesday and Thursday at 10:00 A.M. Contextual timeline marker augmentation program 122 enables Teacher B to record the audio and video of the class. Contextual timeline marker augmentation program 122 uploads the recording of the class to repository database 142 on media server 120 so that the students in the class can review the recording at a later time. During one of the classes, Student C asks a question on a topic ("T1") at 10:21 A.M. Teacher B answered Student C's question at 10:22 A.M. Student C reviews the audio and video of the class the following day. Student C was not happy with the answer Teacher B gave to Student C's question and needed further clarification. Student C pinpoints the time during the class when Student C asked Teacher B the question, 10:21 A.M. Student C asks Teacher B to further clarify Teacher B's answer to Student C's question. Student C's questions is inserted into the video timeline. Contextual timeline marker augmentation program 122 sends Teacher B an alert notification regarding Student C's question. Teacher B rejoins the class. Contextual timeline marker augmentation program 122 automatically scrolls to 10:21 A.M. on the video timeline. Teacher B reviews the previous response to Student C's question and adds to the response.

In a third example, Company D records a training course for the employees of Company D. The training course is mandatory and must be completed by all of the employees of Company D. Multiple employees have a common question about a section of the training course. To answer, the question requires a conversational question and answer period. Typically, this issue is addressed either by adding a Question and Answer section to the comments section of the training course or by collaborating. These typical solutions, however, lead to a duplication of answers and miss the context in which the question was asked. The employees of Company D add their questions to the video timeline. Contextual timeline marker augmentation program 122 sends Company D an alert notification regarding the employees' questions. An author of the training course answers the employees' questions. Contextual timeline marker augmentation program 122 then makes each employee's question and the appropriate answer a conversation that is represented on the video as a timeline marker. Contextual timeline marker augmentation program 122 also makes each employee's question and the appropriate answer available in a Question and Answer section in the comments section of the training course for future employees to review if and when the future employees have similar questions.

In a fourth example, Host E records a video and uploads the video to YouTube. Initially, Host E did not plan on having a Question and Answer period. After uploading the video to YouTube, Host E wanted to collaborate on the topic presented in the video. Host E opens a Question and Answer section to the YouTube video. Host E opens a Question and Answer section to the YouTube video. YouTuber H and YouTuber I discuss what happens (i.e., the topic "S1") in the Host E's video at 10:22 A.M ("T1"). Nonparticipant J has a question about S1. Nonparticipant J pinpoints the time during YouTuber H and YouTuber I's conversation of Host E's video relevant to Nonparticipant J's question at 10:22 A.M. Nonparticipant J inserts the question into the video timeline. Later, YouTuber H and YouTuber I discuss topics "S2" at T2, "S3" at T3, and "S4" at T4. Nonparticipant J inserts questions into the video timeline about S2, S3, and S4 as well. Contextual timeline marker augmentation program 122 sends Host E an alert notification regarding Nonparticipant J's questions. Host E joins YouTuber H and YouTuber I's conversation in the Question and Answer section to the YouTube video. First, contextual timeline marker augmentation program 122 automatically scrolls to Nonparticipant J's question about S1 at T1. Once Host E offers an explanation and an answer for S1, contextual timeline marker augmentation program 122 automatically scrolls to Nonparticipant J's question about S2. This process continues until Host E has answered each of Nonparticipant J's questions. Contextual timeline marker augmentation program 122 enables nonparticipants to ask multiple questions over a period of time about multiple topics and enables the virtual meeting chair to respond. Later, YouTuber H and YouTuber I discuss topics "S2" at T2, "S3" at T3, and "S4" at T4. Nonparticipant J inserts questions into the video timeline about S2, S3, and S4 as well.

In a fifth example, Cinema Sensor Board F meets on a virtual meeting platform to discuss granting an 'A' or 'U' certificate for an upcoming feature film. During the meeting, members of Cinema Sensor Board F find an obscene scene ("T1") starting at 1 hour 23 minutes and 11 seconds. The members of Cinema Sensor Board F agree that T1 must be deleted in order for the film to qualify for a 'U' certificate. The members of Cinema Sensor Board F also find similar objectionable scenes ("T2, T3, T4 . . . Tn") in the film. T2, T3, T4 . . . Tn must also be deleted in order for the film to qualify for a 'U' certificate. Contextual timeline marker augmentation program 122 identifies and records the objectionable scenes T1, T2, T3, T4 . . . Tn. The objectionable scenes T1, T2, T3, T4 . . . Tn are considered the timeline markers. Contextual timeline marker augmentation program 122 opens a forum for conversation about T1, T2, T3, T4 . . . Tn. Contextual timeline marker augmentation program 122 sends the members of Cinema Sensor Board F an alert notification regarding the objectionable scenes T1, T2, T3, T4 . . . Tn. A member of Cinema Sensor Board F clicks on T1 in a forum open for conversation. Contextual timeline marker augmentation program 122 automatically scrolls to obscene scene T1 at 1 hour 23 minutes and 11 seconds. The member of Cinema Sensor Board F review obscene scene T1 as well as comments entered by sensor boards. The member of Cinema Sensor Board F understands the context of obscene scene T1 and decides to delete obscene scene T1.

In a sixth example, Company K is a multinational technology corporation with operations in over 170 countries. Because of its size, Company K has teams of workers who are geographically dispersed over multiple countries. Team L of Company K has 10 team members. The team members are from the United States of America, Canada, Mexico, and India. A team member of Team L schedules a design meeting workshop for 2:00 P.M. Central Standard Time. The team members of Team L from the United States of America, Canada, and Mexico participate in the meeting. However, the team members of Team L from India could not join the meeting because of the time difference. The team members of Team L from the United States of America, Canada, and Mexico discuss the points on the agenda of the meeting but are unable to conclude the meeting. To do so, the team needs the input of the team members from India. The team members who participated in the meeting specifically called out the required inputs. The team members of Team L from the United States of America, Canada, and Mexico discuss the points on the agenda of the meeting but are unable to conclude the meeting. To do so, the team needs the input of the team members from India. Contextual timeline marker augmentation program 122 sends the team members of Team L from India an alert notification regarding the points on the agenda of the meeting that require the team members' input in order to conclude the meeting. While reviewing the text of the meeting, the team members of Team L from India find an ambiguous statement and want clarification from the other team members. Since the meeting already happened and the team members of Team L from India were unable to ask their questions at the appropriate time, the conversation went in a different direction. The team members of Team L from India request a follow up meeting.

Figure 7:
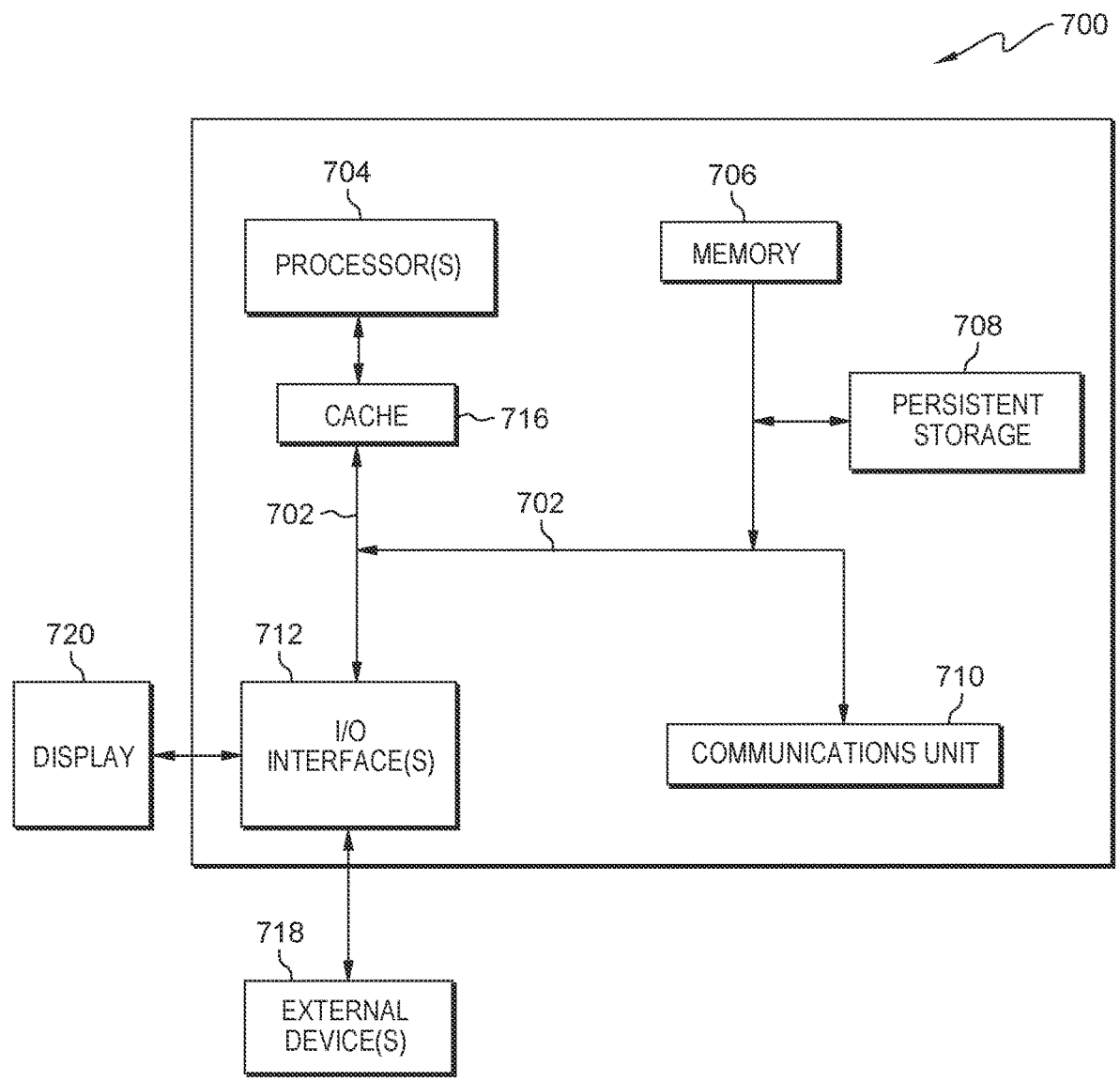
FIG. 7 is a block diagram illustrating the components of a computing device within the distributed data processing environment of FIG. 1, in accordance with an embodiment of the present invention.

FIG. 7 is a block diagram illustrating the components of computing device 700 within distributed data processing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

Computing device 700 includes processor(s) 704, memory 706, cache 716, communications fabric 702, persistent storage 708, input/output (I/O) interface(s) 712, and communications unit 710.

Communications fabric 702 provides communications between memory 706, cache 716, persistent storage 708, input/output (I/O) interface(s) 712, and communications unit 710. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a cross switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Program instructions and data (e.g., software and data 714) used to practice embodiments of the present invention may be stored in persistent storage 708 and in memory 706 for execution by one or more of the respective processor(s) 704 via cache 716. In an embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708. Software and data 714 can be stored in persistent storage 708 for access and/or execution by one or more of the respective processor(s) 704 via cache 716. With respect to user computing device 130, software and data 714 includes user interface 132. With respect to media server 120, software and data 714 includes contextual timeline marker augmentation program 122.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data (e.g., software and data 714) used to practice embodiments of the present invention may be downloaded to persistent storage 708 through communications unit 710.

I/O interface(s) 712 allows for input and output of data with other devices that may be connected to each computer system. For example, I/O interface(s) 712 may provide a connection to external device(s) 718, such as a keyboard, a keypad, a touch screen, and/or some other suitable input device. External device(s) 718 can also include portable computer readable storage media, such as, for example, thumb drives, portable optical or magnetic disks, and memory cards. Program instructions and data (e.g., software and data 714) used to practice embodiments of the present invention can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to a virtual meeting chair starting a virtual meeting on a virtual meeting platform with one or more participants, recording, by one or more processors, the virtual meeting;
responsive to the virtual meeting chair ending the virtual meeting on the virtual meeting platform with an incomplete task, creating, by the one or more processors, an augmented recording of the virtual meeting, wherein the augmented recording includes a timeline composed of a plurality of timeline markers, wherein a timeline marker is associated with a conversation that occurs at a contextual conversation point during the virtual meeting;
enabling, by the one or more processors, a post-meeting collaboration enabled conversation between the virtual meeting chair and a nonparticipant to complete the incomplete task, wherein enabling the post-meeting collaboration enabled conversation further comprises:
enabling, by the one or more processors, the nonparticipant to open the augmented recording of the virtual meeting;
enabling, by the one or more processors, the nonparticipant to resume the augmented recording of the virtual meeting;
capturing, by the one or more processors, a required input associated with the incomplete task from the nonparticipant;
determining, by the one or more processors, whether a second input is required from the nonparticipant at a second timeline marker;
responsive to determining the second input is not required from the nonparticipant at the second timeline marker, determining, by the one or more processors, whether the nonparticipant has a question for the virtual meeting chair;
responsive to determining the nonparticipant has a first question for the virtual meeting chair, enabling, by the one or more processors, the nonparticipant to ask the virtual meeting chair the first question;
adding, by the one or more processors, a timeline marker associated with the first question to the augmented recording;
sending, by the one or more processors, an alert notification to the virtual meeting chair regarding the new timeline marker associated with the first question to the augmented recording added;
enabling, by the one or more processors, the virtual meeting chair to join the post-meeting collaboration enabled conversation with the nonparticipant;
enabling, by the one or more processors, the virtual meeting chair to answer the first question;
determining, by the one or more processors, whether the nonparticipant has a second question for the virtual meeting chair; and
responsive to determining the nonparticipant does not have the second question for the virtual meeting chair and responsive to determining that a goal of the virtual meeting has been met, ending, by the one or more processors, the post-meeting collaboration enabled conversation;
requesting, by the one or more processors, feedback on a timeline marker response associated with the incomplete task from a timeline marker creator; and
responsive to receiving the feedback on the timeline marker response-associated with the incomplete task from the timeline marker creator, applying, by the one or more processors, the feedback to the timeline marker response.

2. The computer-implemented method of claim 1, wherein creating the augmented recording of the virtual meeting further comprises:
converting, by the one or more processors, the augmented recording of the virtual meeting to a text format;
creating, by the one or more processors, a title for the virtual meeting; creating, by the one or more processors, a caption for the virtual meeting;
linking, by the one or more processors, the title of the virtual meeting and the caption for the virtual meeting; and
integrating, by the one or more processors, a timeline into a text format of the virtual meeting.

3. The computer-implemented method of claim 2, further comprising:
building, by the one or more processors, a list of the one or more participants and a list of the one or more nonparticipants, wherein building the list of the one or more participants and the list of the one or more nonparticipants further comprises:
identifying, by the one or more processors, the virtual meeting chair;
identifying, by the one or more processors, the one or more participants; and
identifying, by the one or more processors, the one or more nonparticipants.

4. The computer-implemented method of claim 3, further comprising:
identifying, by the one or more processors, one or more conversations of the virtual meeting in which post-meeting collaboration is necessary;
labeling, by the one or more processors, the one or more conversations of the virtual meeting in which post-meeting collaboration is necessary as post-meeting collaboration enabled; and
setting, by the one or more processors, one or more post-meeting collaboration parameters, wherein the one or more post-meeting collaboration parameters include a designation of the one or more nonparticipants and a length of time post-meeting collaboration will be supported.

5. The computer-implemented method of claim 4, further comprising:
identifying, by the one or more processors, a topic of the one or more post-meeting collaboration enabled conversations, wherein identifying the topic of each of the one or more post-meeting collaboration enabled conversations further comprises:

highlighting, by the one or more processors, one or more relevant topics of the one or more post-meeting collaboration enabled conversations;

tagging, by the one or more processors, the one or more relevant topics highlighted and the timeline markers associated with the one or more relevant topics highlighted; and ranking, by the one or more processors, the one or more relevant topics highlighted and the timeline markers associated with the one or more relevant topics highlighted.

6. The computer-implemented method of claim 1, wherein enabling the nonparticipant to open the augmented recording of the virtual meeting further comprises:

integrating, by the one or more processors, the nonparticipant into the augmented recording of the virtual meeting as a virtual participant;

displaying, by the one or more processors, an avatar of the nonparticipant in the augmented recording of the virtual meeting;

providing, by the one or more processors, the nonparticipant with an agenda of the virtual meeting, one or more goals to accomplish during the virtual meeting, and a text format of the virtual meeting;

highlighting, by the one or more processors, one or more relevant topics of the post-meeting collaboration enabled conversation and one or more timeline markers associated with the one or more relevant topics of the post-meeting collaboration enabled conversation;

directing, by the one or more processors, the nonparticipant to a first timeline marker for which an input is required from the nonparticipant and to an associated question in the text format of the virtual meeting.

7. The computer-implemented method of claim 1, wherein enabling the nonparticipant to ask the virtual meeting chair the first question further comprises:

converting, by the one or more processors, the first question to text;

deriving, by the one or more processors, a context of the first question using natural language processing;

creating, by the one or more processors, the new timeline marker representative of the first question; and adding, by the one or more processors, the new timeline marker to the timeline at the particular contextual conversation point most relevant to the context of the first question.

8. The computer-implemented method of claim 1, further comprising:

prior to applying the feedback to the timeline marker response, receiving, by the one or more processors, the feedback on the timeline marker response;

retrieving, by the one or more processors, a corporate profile for each of the one or more participants;

prioritizing, by the one or more processors, the feedback response; and leveraging, by the one or more processors, a combination of feedback methods to determine whether the timeline marker response is a positive timeline marker response or a negative timeline marker response.

9. The computer-implemented method of claim 1, wherein applying the feedback to the timeline marker response further comprises:

processing, by the one or more processors, the feedback on the timeline marker response received;

incorporating, by the one or more processors, the positive timeline marker response into the augmented recording of the virtual meeting;

discarding, by the one or more processors, the negative timeline marker response into the augmented recording of the virtual meeting;

making, by the one or more processors, a recommendation to the virtual meeting chair how to improve the content of the conversation based on a clustering of one or more similar questions and answers;

enabling, by the one or more processors, the virtual meeting chair to edit the augmented recording of the virtual meeting to remove one or more parts of the augmented recording of the virtual meeting where there is the clustering of the one or more similar questions and answers; and removing, by the one or more processors, noise from the augmented recording of the virtual meeting, wherein the noise includes one or more questions, answers, or discussions that are not relevant to the conversation.

10. The computer-implemented method of claim 1, wherein the feedback on the timeline marker response is provided by means of a vote, by a thumbs up or a thumbs down, or by natural language feedback on which sentiment analysis can be performed.

11. A computer program product comprising:

one or more computer readable storage media and program instructions stored on the one or more computer readable storage media, the program instructions comprising:

responsive to a virtual meeting chair starting a virtual meeting on a virtual meeting platform with one or more participants, program instructions to record the virtual meeting;

responsive to the virtual meeting chair ending the virtual meeting on the virtual meeting platform with an incomplete task, program instructions to create an augmented recording of the virtual meeting, wherein the augmented recording includes a timeline composed of a plurality of timeline markers, wherein a timeline marker is associated with a conversation that occurs at a contextual conversation point during the virtual meeting;

program instructions to enable a post-meeting collaboration enabled conversation between the virtual meeting chair and a nonparticipant to complete the incomplete task, wherein enabling the post-meeting collaboration enabled conversation further comprises:

program instructions to enable the nonparticipant to open the augmented recording of the virtual meeting;

program instructions to enable the nonparticipant to resume the augmented recording of the virtual meeting;

program instructions to capture a required input associated with the incomplete task from the nonparticipant;

program instructions to determine whether a second input is required from the nonparticipant at a second timeline marker;

responsive to determining the second input is not required from the nonparticipant at the second timeline marker, program instructions to determine whether the nonparticipant has a question for the virtual meeting chair;

responsive to determining the nonparticipant has a first question for the virtual meeting chair, program instructions to enable the nonparticipant to ask the virtual meeting chair the first question;

program instructions to add a timeline marker associated with the first question to the augmented recording;

program instructions to send an alert notification to the virtual meeting chair regarding the new timeline marker associated with the first question to the augmented recording added;

program instructions to enable the virtual meeting chair to join the post-meeting collaboration enabled conversation with the nonparticipant;

program instructions to enable the virtual meeting chair to answer the first question;

program instructions to determine whether the nonparticipant has a second question for the virtual meeting chair; and responsive to determining the nonparticipant does not have the second question for the virtual meeting chair and responsive to determining that a goal of the virtual meeting has been met, program instructions to end the post-meeting collaboration enabled conversation;

program instructions to request feedback on a timeline marker response associated with the incomplete task from a timeline marker creator; and responsive to receiving the feedback on the timeline marker response associated with the incomplete task from the timeline marker creator, program instructions to apply the feedback to the timeline marker response.

12. The computer program product of claim 11, wherein enabling the nonparticipant to open the augmented recording of the virtual meeting further comprises:

program instructions to integrate the nonparticipant into the augmented recording of the virtual meeting as a virtual participant;

program instructions to display an avatar of the nonparticipant in the augmented recording of the virtual meeting;

program instructions to provide the nonparticipant with an agenda of the virtual meeting, one or more goals to accomplish during the virtual meeting, and a text format of the virtual meeting;

program instructions to highlight one or more relevant topics of the post-meeting collaboration enabled conversation and one or more timeline markers associated with the one or more relevant topics of the post-meeting collaboration enabled conversation;

program instructions to direct the nonparticipant to a first timeline marker for which an input is required from the nonparticipant and to an associated question in the text format of the virtual meeting.

13. The computer program product of claim 11, wherein enabling the nonparticipant to ask the virtual meeting chair the first question further comprises:

program instructions to convert the first question to text;

program instructions to derive a context of the first question using natural language processing;

program instructions to create the new timeline marker representative of the first question; and program instructions to add the new timeline marker to the timeline at the particular contextual conversation point most relevant to the context of the first question.

14. A computer system comprising:
one or more computer processors;
one or more computer readable storage media;
program instructions collectively stored on the one or more computer readable storage media for execution by at least one of the one or more computer processors, the stored program instructions comprising:

responsive to a virtual meeting chair starting a virtual meeting on a virtual meeting platform with one or more participants, program instructions to record the virtual meeting;

responsive to the virtual meeting chair ending the virtual meeting on the virtual meeting platform with an incomplete task, program instructions to create an augmented recording of the virtual meeting, wherein the augmented recording includes a timeline composed of a plurality of timeline markers, wherein a timeline marker is associated with a conversation that occurs at a contextual conversation point during the virtual meeting;

program instructions to enable a post-meeting collaboration enabled conversation between the virtual meeting chair and a nonparticipant to complete the incomplete task, wherein enabling the post-meeting collaboration enabled conversation further comprises:

program instructions to enable the nonparticipant to open the augmented recording of the virtual meeting;

program instructions to enable the nonparticipant to resume the augmented recording of the virtual meeting;

program instructions to capture a required input associated with the incomplete task from the nonparticipant;

program instructions to determine whether a second input is required from the nonparticipant at a second timeline marker;

responsive to determining the second input is not required from the nonparticipant at the second timeline marker, program instructions to determine whether the nonparticipant has a question for the virtual meeting chair;

responsive to determining the nonparticipant has a first question for the virtual meeting chair, program instructions to enable the nonparticipant to ask the virtual meeting chair the first question;

program instructions to add a timeline marker associated with the first question to the augmented recording;

program instructions to send an alert notification to the virtual meeting chair regarding the new timeline marker associated with the first question to the augmented recording added;

program instructions to enable the virtual meeting chair to join the post-meeting collaboration enabled conversation with the nonparticipant;

program instructions to enable the virtual meeting chair to answer the first question;

program instructions to determine whether the nonparticipant has a second question for the virtual meeting chair; and responsive to determining the nonparticipant does not have the second question for the virtual meeting chair and responsive to determining that a goal of the virtual meeting has been met, program instructions to end the post-meeting collaboration enabled conversation;

program instructions to request feedback on a timeline marker response associated with the incomplete task from a timeline marker creator; and responsive to receiving the feedback on the timeline marker response associated with the incomplete task from the timeline marker creator, program instructions to apply the feedback to the timeline marker response.

15. The computer system of claim 14, wherein enabling the nonparticipant to open the augmented recording of the virtual meeting further comprises:
- program instructions to integrate the nonparticipant into the augmented recording of the virtual meeting as a virtual participant;
- program instructions to display an avatar of the nonparticipant in the augmented recording of the virtual meeting;
- program instructions to provide the nonparticipant with an agenda of the virtual meeting, one or more goals to accomplish during the virtual meeting, and a text format of the virtual meeting;
- program instructions to highlight one or more relevant topics of the post-meeting collaboration enabled conversation and one or more timeline markers associated with the one or more relevant topics of the post-meeting collaboration enabled conversation;
- program instructions to direct the nonparticipant to a first timeline marker for which an input is required from the nonparticipant and to an associated question in the text format of the virtual meeting.

16. The computer system of claim 14, wherein enabling the nonparticipant to ask the virtual meeting chair the first question further comprises:
- program instructions to convert the first question to text;
- program instructions to derive a context of the first question using natural language processing;
- program instructions to create the new timeline marker representative of the first question; and
- program instructions to add the new timeline marker to the timeline at the particular contextual conversation point most relevant to the context of the first question.

17. The computer program product of claim 11, further comprising:
- program instructions to identify one or more conversations of the virtual meeting in which post-meeting collaboration is necessary;
- program instructions to label the one or more conversations of the virtual meeting in which post-meeting collaboration is necessary as post-meeting collaboration enabled; and
- program instructions to set post-meeting collaboration parameters, wherein the post-meeting collaboration parameters include a designation of the one or more nonparticipants and a length of time post-meeting collaboration will be supported.

18. The computer program product of claim 11, further comprising:
- program instructions to identify a topic of the post-meeting collaboration enabled conversation, wherein identifying the topic of each of the post-meeting collaboration enabled conversation further comprises:
  - program instructions to highlight one or more relevant topics of the post-meeting collaboration enabled conversation;
  - program instructions to tag the one or more relevant topics highlighted and the timeline markers associated with the one or more relevant topics highlighted; and
  - program instructions to rank the one or more relevant topics highlighted and the timeline markers associated with the one or more relevant topics highlighted.

19. The computer system of claim 14, further comprising:
- program instructions to identify one or more conversations of the virtual meeting in which post-meeting collaboration is necessary;
- program instructions to label the one or more conversations of the virtual meeting in which post-meeting collaboration is necessary as post-meeting collaboration enabled; and
- program instructions to set post-meeting collaboration parameters, wherein the post-meeting collaboration parameters include a designation of the one or more nonparticipants and a length of time post-meeting collaboration will be supported.

20. The computer system of claim 14, further comprising:
- program instructions to identify a topic of the post-meeting collaboration enabled conversation, wherein identifying the topic of each of the post-meeting collaboration enabled conversation further comprises:
  - program instructions to highlight one or more relevant topics of the post-meeting collaboration enabled conversation;
  - program instructions to tag the one or more relevant topics highlighted and the timeline markers associated with the one or more relevant topics highlighted; and
  - program instructions to rank the one or more relevant topics highlighted and the timeline markers associated with the one or more relevant topics highlighted.

* * * * *